(12) United States Patent
Ota et al.

(10) Patent No.: US 12,157,489 B2
(45) Date of Patent: *Dec. 3, 2024

(54) HMI CONTROL DEVICE AND STORAGE MEDIUM THEREOF

(71) Applicant: DENSO CORPORATION, Kariya (JP)

(72) Inventors: Yuji Ota, Kariya (JP); Asako Nagata, Kariya (JP); Takeshi Yamamoto, Kariya (JP); Shizuka Yokoyama, Kariya (JP); Takuya Kume, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,096

(22) Filed: Jan. 12, 2024

(65) Prior Publication Data

US 2024/0149900 A1 May 9, 2024

Related U.S. Application Data

(63) Continuation of application No. 17/749,327, filed on May 20, 2022, now Pat. No. 11,904,881, which is a (Continued)

(30) Foreign Application Priority Data

Nov. 27, 2019 (JP) ................................ 2019-214229
Nov. 4, 2020 (JP) ................................ 2020-184660

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 40/04* (2013.01); *B60W 40/09* (2013.01);
(Continued)

(58) Field of Classification Search
CPC ...... B60W 50/14; B60W 40/04; B60W 40/09; B60W 40/105; B60W 50/0097;
(Continued)

(56) References Cited

U.S. PATENT DOCUMENTS

| 2016/0231743 A1 | 8/2016 | Bendewald et al. |
| 2017/0038773 A1 | 2/2017 | Gordon et al. |

(Continued)

FOREIGN PATENT DOCUMENTS

| JP | 2015-017944 A | 1/2015 |
| JP | 2017-021756 A | 1/2017 |

(Continued)

OTHER PUBLICATIONS

U.S. Appl. No. 17/749,327, filed May 20, 2022, Yuji Ota.

*Primary Examiner* — Joseph H Feild
*Assistant Examiner* — Cal J Eustaquio
(74) *Attorney, Agent, or Firm* — Harness, Dickey & Pierce, P.L.C.

(57) ABSTRACT

An HMI control device is configured to control an HMI device mounted in a vehicle, which is capable of performing an autonomous driving as a first task. The HMI control device is configured to: acquire a possible duration for the autonomous driving; and present, by the HMI device, a second task that an occupant on a driver's seat is able to start executing during the autonomous driving based on the possible duration acquired by the time acquisition unit.

4 Claims, 13 Drawing Sheets

Related U.S. Application Data continuation of application No. PCT/JP2020/042454, filed on Nov. 13, 2020.

(51) Int. Cl.

| | |
|---|---|
| *B60K 35/28* | (2024.01) |
| *B60K 35/29* | (2024.01) |
| *B60W 40/04* | (2006.01) |
| *B60W 40/08* | (2012.01) |
| *B60W 40/09* | (2012.01) |
| *B60W 40/105* | (2012.01) |
| *B60W 50/00* | (2006.01) |
| *B60W 60/00* | (2020.01) |

(52) U.S. Cl.
CPC ...... *B60W 40/105* (2013.01); *B60W 50/0097* (2013.01); *B60W 60/0016* (2020.02); *B60K 35/28* (2024.01); *B60K 35/29* (2024.01); *B60K 2360/175* (2024.01); *B60K 2360/1868* (2024.01); *B60K 2360/195* (2024.01); *B60W 2040/0818* (2013.01); *B60W 2050/146* (2013.01); *B60W 2540/229* (2020.02); *B60W 2554/406* (2020.02)

(58) Field of Classification Search
CPC ..... B60W 60/0016; B60W 2040/0818; B60W 2050/146; B60W 2540/229; B60W 2554/406; B60K 35/00; B60K 35/28; B60K 35/29; B60K 2360/175; B60K 2360/1868; B60K 2360/195; B60K 2360/166; G01C 21/36; G08G 1/00; G08G 1/16
See application file for complete search history.

(56) References Cited

U.S. PATENT DOCUMENTS

| | | |
|---|---|---|
| 2018/0348758 A1 | 12/2018 | Nakamura et al. |
| 2019/0204827 A1 | 7/2019 | Bhalla et al. |
| 2020/0298876 A1 | 9/2020 | Mimura et al. |
| 2022/0274621 A1 | 9/2022 | Ota et al. |

FOREIGN PATENT DOCUMENTS

| | | |
|---|---|---|
| JP | 2017107502 A | 6/2017 |
| JP | 2019001350 A | 1/2019 |
| WO | WO-2017158772 A1 | 9/2017 |

HMI CONTROL DEVICE AND STORAGE MEDIUM THEREOF

CROSS REFERENCE TO RELATED APPLICATIONS

The present application is a continuation application of U.S. patent application Ser. No. 17/749,327 filed on May 20, 2022 which is a continuation application of International Patent Application No. PCT/JP2020/042454 filed on Nov. 13, 2020, which designated the U.S. and claims the benefits of priority from Japanese Patent Application No. 2019-214229 filed on Nov. 27, 2019 and Japanese Patent Application No. 2020-184660 filed on Nov. 4, 2020. The entire disclosures of all of the above applications are incorporated herein by reference.

TECHNICAL FIELD

The present disclosure relates to an HMI control device and an HMI control program product for controlling an HMI device mounted in a vehicle capable of autonomous driving. HMI stands for human-machine interface. The present disclosure also relates to a driving control device and a driving control program product each of which controls a driving of the vehicle capable of autonomous driving.

BACKGROUND

There has been known an autonomous driving system for vehicle in which a driver can execute a secondary task during autonomous driving.

SUMMARY

The present disclosure provides an HMI control device configured to control an HMI device mounted in a vehicle, which is capable of performing an autonomous driving as a first task. The HMI control device is configured to: acquire a possible duration for the autonomous driving; and present, by the HMI device, a second task that an occupant on a driver's seat is able to start executing during the autonomous driving based on the possible duration acquired by the time acquisition unit. The present disclosure also provides a driving control device configured to control a driving of a vehicle, which is capable of performing an autonomous driving as a first task within a predetermined speed range during a traffic congestion. The driving control device is configured to: acquire at least a traveling state of the vehicle; determine an executability of the autonomous driving based on the acquired traveling state; control a traveling speed of the vehicle in accordance with the determined executability of the autonomous driving; acquire at least a congestion state as the traveling state of the vehicle; acquire, from an HMI control device that controls an HMI device mounted in the vehicle, an execution state of a second task operated by an occupant on a driver's seat; and control the traveling speed of the vehicle to be increased within the predetermined speed range of the autonomous driving in response to the acquired congestion state indicating a temporary resolution of the traffic congestion and a continuation request for the second task under execution being made by the occupant.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
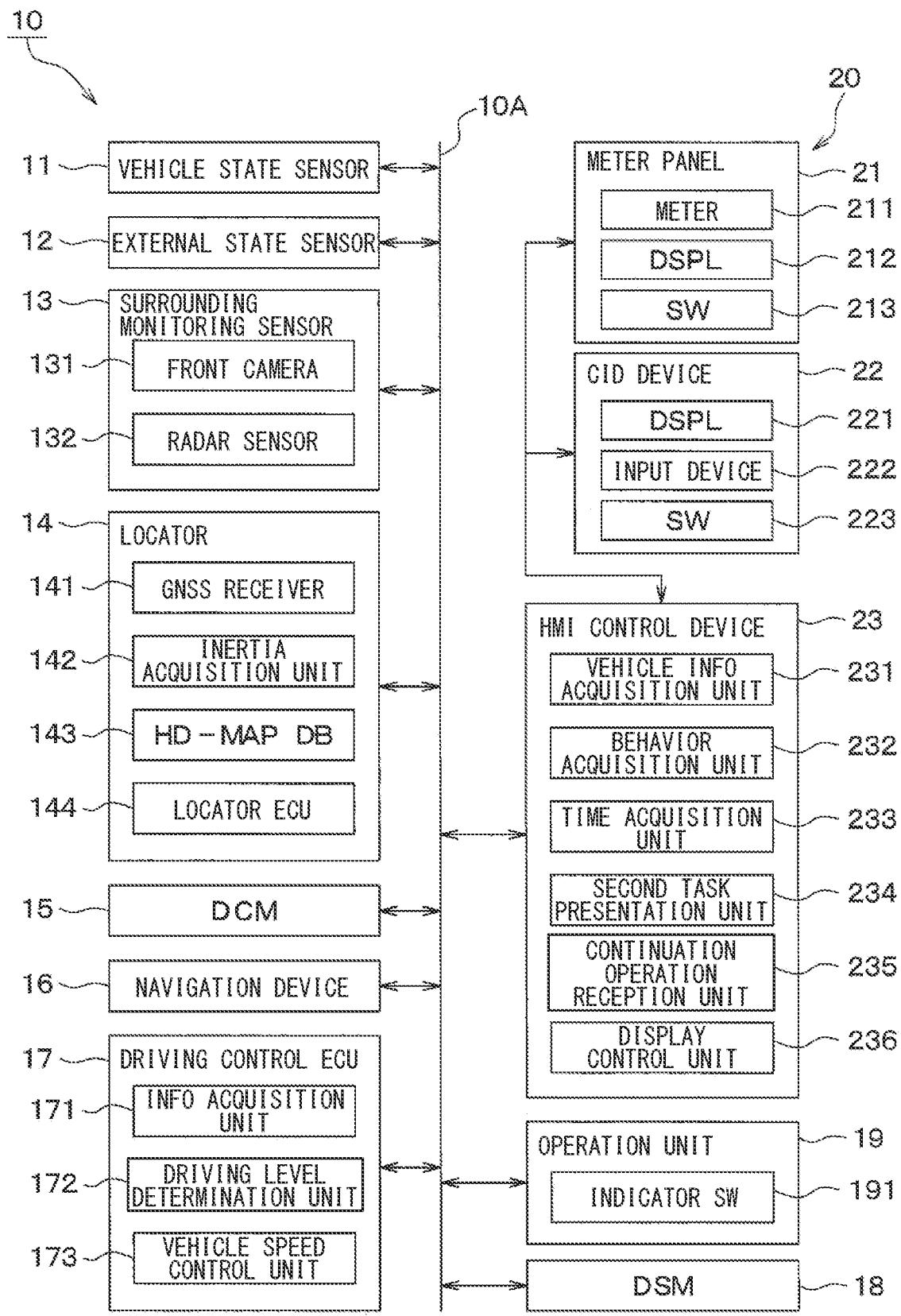
FIG. 1 is a block diagram illustrating a schematic configuration of an in-vehicle system including a driving control electronic control unit (ECU) and an HMI control device according to an embodiment.

Various autonomous driving systems for vehicles such as automobiles have been proposed. During autonomous driving, a driver who is an occupant on a driver's seat of a vehicle can freely execute a second task. The second task is a task executed by the driver except for a driving operation, which corresponds to a first task. Specifically, the second task includes, for example, a mobile communication terminal operation, video content viewing, and the like. The second task is also referred to as a "non-driving task" or a "secondary activity".

The required execution duration for the second task varies. That is, for example, when a mobile communication terminal such as a mobile phone is operated, the required execution duration is relatively short. In contrast, in the case of movie watching, the required execution duration may be long. Therefore, for example, when a second task requiring a long execution duration is interrupted in the middle of execution, or when a selection operation for a second task requiring a short execution duration is frequently required, convenience may be impaired.

According to an aspect of the present disclosure, an HMI device is configured to control an HMI device mounted in a vehicle, which is capable of performing an autonomous driving as a first task. The HMI control device includes: a time acquisition unit that acquires a possible duration for the autonomous driving; and a presentation unit that presents, by the HMI device, a second task that an occupant on a driver's seat is able to start executing during the autonomous driving based on the possible duration acquired by the time acquisition unit.

According to another aspect of the present disclosure, an HMI control device is configured to control an HMI device mounted in a vehicle, which is capable of performing an autonomous driving as a first task. The HMI control device includes: a time acquisition unit that acquires a possible duration for the autonomous driving, the time acquisition unit acquiring the possible duration based on a predicted duration of a traffic congestion in a case where the autonomous driving is started due to the traffic congestion; a presentation unit that presents, by the HMI device, a second task that an occupant on a driver's seat is able to execute during the autonomous driving based on the possible duration acquired by the time acquisition unit; and a continuation operation reception unit that receives an input operation for continuing the second task under execution in a case where a temporary resolution of the traffic congestion is detected.

According to another aspect of the present disclosure, an HMI control device is configured to control an HMI device mounted in a vehicle, which is capable of performing an autonomous driving as a first task. The HMI control device includes: a time acquisition unit that acquires a possible duration for the autonomous driving; a presentation unit that presents, by the HMI device, a second task that an occupant on a driver's seat is able to execute during the autonomous driving based on the possible duration acquired by the time acquisition unit; a behavior acquisition unit that acquires a detection result of a behavior of the occupant on the driver's seat; and a display control unit that controls the HMI device to display a road condition of a place toward which the vehicle is traveling when the behavior acquisition unit acquires the detection result indicating that the occupant on the driver's seat is checking the road condition of the place toward which the vehicle is traveling.

According to another aspect of the present disclosure, an HMI control device is configured to control an HMI device mounted in a vehicle, which is capable of performing an autonomous driving as a first task. The HMI control device includes: a time acquisition unit that acquires a possible duration for the autonomous driving; and a presentation unit that presents, by the HMI device, a plurality of second tasks that an occupant on a driver's seat is able to execute during the autonomous driving based on the possible duration acquired by the time acquisition unit. The presentation unit presents the plurality of second tasks having different required execution durations in a case where the time acquisition unit fails to acquire the possible duration for the autonomous driving so that the occupant is able to select one of the plurality of second tasks during the autonomous driving.

According to another aspect of the present disclosure, an HMI control device configured to control an HMI device mounted in a vehicle, which is capable of performing an autonomous driving as a first task. The HMI control device includes: a time acquisition unit that acquires a possible duration for the autonomous driving; and a presentation unit that presents, by the HMI device, a second task that an occupant on a driver's seat is able to execute during the autonomous driving based on the possible duration acquired by the time acquisition unit. In a case where the possible duration corresponding to a specific traveling section, in which the autonomous driving is set to be possible, is shorter than a predetermined execution lower limit, no second task is permitted to start being executed in the specific traveling section.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving; and presenting, by the HMI device, a second task that an occupant on a driver's seat is able to start executing during the autonomous driving based on the acquired possible duration.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving based on a predicted duration of a traffic congestion in a case where the autonomous driving is started due to the traffic congestion; presenting, by the HMI device, a second task that an occupant on a driver's seat is able to execute during the autonomous driving based on the acquired possible duration; and receiving an input operation for continuing the second task under execution in a case where a temporary resolution of the traffic congestion is detected.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving; presenting, by the HMI device, a second task that an occupant on a driver's seat is able to execute during the autonomous driving based on the acquired possible duration; acquiring a detection result of a behavior of the occupant on the driver's seat; and controlling the HMI device to display a road condition of a place toward which the vehicle is traveling when the acquired detection result indicates that the occupant on the driver's seat is checking the road condition of the place toward which the vehicle is traveling.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving; in response to a success in the acquiring of the possible duration, presenting, by the HMI device, a second task that an occupant on a driver's seat is able to execute during the autonomous driving based on the acquired possible duration; and in response to a failure in the acquiring of the possible duration, presenting, by the HMI device, a plurality of second tasks having different required execution durations so that an occupant on a driver's seat is able to select during the autonomous driving.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving; and presenting, by the HMI device, a second task that an occupant on a driver's seat is able to execute during the autonomous driving based on the acquired possible duration. In a case where the possible duration corresponding to a specific traveling section, in which the autonomous driving is set to be possible, is shorter than a predetermined execution lower limit, no second task is permitted to start being executed in the specific traveling section.

According to another aspect of the present disclosure, a driving control device is configured to control a driving of a vehicle, which is capable of performing an autonomous driving as a first task within a predetermined speed range during a traffic congestion. The driving control device includes: an information acquisition unit that acquires at least a traveling state of the vehicle; a driving level determination unit that determines an executability of the autonomous driving based on the traveling state acquired by the information acquisition unit; and a vehicle speed control unit that controls a traveling speed of the vehicle in accordance with the executability of the autonomous driving determined by the driving level determination unit. The information acquisition unit acquires a congestion state as the traveling state. The information acquisition unit further acquires, from an HMI control device that controls an HMI device mounted in the vehicle, an execution state of a second task operated by an occupant on a driver's seat. The vehicle speed control unit performs a speed-increase control to increase the traveling speed of the vehicle within the predetermined speed range of the autonomous driving in response to the acquired congestion state indicating a temporary resolution of the traffic congestion and a continuation request for the second task under execution being made by the occupant.

According to another aspect of the present disclosure, a driving control program product stored in a computer-readable non-transitory storage medium is provided. The driving control program product includes instructions to be executed by at least one processor of a driving control device that controls driving of a vehicle, which is capable of performing an autonomous driving as a first task within a predetermined speed range during a traffic congestion. The instructions include: acquiring at least a traveling state of the vehicle; determining an executability of the autonomous driving based on the acquired traveling state; controlling a traveling speed of the vehicle in accordance with the determined executability of the autonomous driving; acquiring at least a congestion state as the traveling state of the vehicle; acquiring, from an HMI control device that controls an HMI device mounted in the vehicle, an execution state of a second task operated by an occupant on a driver's seat; and controlling the traveling speed of the vehicle to be increased within the predetermined speed range of the autonomous driving in response to the acquired congestion state indicating a temporary resolution of the traffic congestion and a continuation request for the second task under execution being made by the occupant.

EMBODIMENTS

Hereinafter, embodiments of the present disclosure will be described with reference to the drawings. When various modifications applicable to one embodiment are inserted in the middle of a series of descriptions concerning the embodiment, the understanding of the embodiment may be hindered. Therefore, the modifications will not be described in the middle of a series of descriptions concerning the embodiment but collectively described thereafter.

(Configuration) Referring to FIG. 1, an in-vehicle system 10 is mounted in a vehicle capable of autonomous driving. The "autonomous driving" refers to a driving autonomy level corresponding to Levels 3 to 5 in the standard "SAE J3016" published by SAE International, at which the in-vehicle system 10 is in charge of all dynamic driving tasks. SAE stands for Society of Automotive Engineers. The definition of the "dynamic driving task" will be described later. A level X in "SAE J3016" is hereinafter referred to as "SAE Level X". X is any of 0 to 5. In the present embodiment, the in-vehicle system 10 is configured to be mounted in an automobile as a vehicle so that the driving autonomy level in the vehicle can be set to any one of SAE Levels 0 to 3. Hereinafter, the vehicle mounted with the in-vehicle system 10 may be referred to as an "own vehicle".

(Overall System Configuration)

The in-vehicle system 10 is an in-vehicle network including an in-vehicle communication line 10A and a plurality of nodes and the like connected to each other via the in-vehicle communication line 10A and is configured to be able to perform various vehicle controls during the driving of the own vehicle, various display operations associated with the various vehicle controls, and the like. The in-vehicle system 10 is configured to conform to a predetermined communication standard such as CAN (international registered trademark: international registered number 1048262A). CAN (international registered trademark) stands for Controller Area Network.

The in-vehicle system 10 includes a vehicle state sensor 11, an external state sensor 12, a surrounding monitoring sensor 13, a locator 14, a DCM 15, a navigation device 16, a driving control ECU 17, a DSM 18, an operation unit 19, and an HMI device 20. DCM stands for data communication module. ECU stands for electronic control unit. DSM stands for driver status monitor. The vehicle state sensor 11 to the HMI device 20 are connected to each other via the in-vehicle communication line 10A.

The HMI device 20 includes a meter panel 21, a CID device 22, and an HMI control device 23. CID stands for center information display. The meter panel 21 and the CID device 22 are connected to the HMI control device 23 via a sub-communication line different from the in-vehicle communication line 10A so as to be able to perform information communication. The HMI control device 23 is provided as a node connected to the in-vehicle communication line 10A.

(Various Sensors)

The vehicle state sensor 11 is provided to generate outputs corresponding to various amounts related to the driving state of the own vehicle. The "various amounts related to the driving state" include various amounts related to the state of the driving operation by the driver, such as an accelerator operation amount, a brake operation amount, a shift position, and a steering angle. The "driver" refers to an occupant who is in charge of or executes a dynamic driving task, typically, an occupant seated on a driver's seat in the own vehicle, and may also be referred to as an "occupant on the driver's seat". The "various amounts related to the driving state" include physical amounts related to the behavior of the own vehicle, such as a traveling speed, an angular velocity, a longitudinal acceleration, and a lateral acceleration. That is, the vehicle state sensor 11 is a generic name of well-known sensors necessary for driving control, such as an accelerator opening sensor, a steering angle sensor, a wheel speed sensor, an angular velocity sensor, and an acceleration sensor, for simplification of illustration and description. The vehicle state sensor 11 is provided to be able to provide a detection output to each unit such as the driving control ECU 17 via the in-vehicle communication line 10A.

The external state sensor 12 is provided to generate outputs corresponding to various amounts related to the natural environment around the own vehicle. The "various amounts related to the natural environment" include, for example, physical amounts such as an outside temperature, a rainfall amount, and illuminance. That is, the external state sensor 12 is a generic term for well-known sensors, such as an outside air temperature sensor, a raindrop sensor, and an illuminance sensor, for simplification of illustration and description. The external state sensor 12 is provided to be able to provide a detection output to each unit such as the driving control ECU 17 via the in-vehicle communication line 10A.

The surrounding monitoring sensor 13 is provided to mainly detect a traffic environment except for that detectable by the external state sensor 12 among the surrounding traffic environments of the own vehicle. Specifically, the surrounding monitoring sensor 13 is configured to be able to detect a moving object and a stationary object in a predetermined detection range around the own vehicle. The "moving object" includes a pedestrian, a cyclist, an animal, and another vehicle that is traveling. The "stationary object" includes a roadside structure (e.g., a median strip, a building, etc.) in addition to an on-road dropped object, a guardrail, a curb, a parked or stopped vehicle, a road sign, and a road marking. The surrounding monitoring sensor 13 may also be referred to as an "ADAS sensor". ADAS stands for advanced driver-assistance systems. In the present embodiment, the surrounding monitoring sensor 13 includes a front camera 131 and a radar sensor 132 as a configuration for detecting a moving object and a stationary object.

The front camera 131 is provided to capture the images on the front side and the front lateral side of the own vehicle. In the present embodiment, the front camera 131 is a digital camera device and includes an image sensor such as a CCD or a CMOS. CCD stands for charge-coupled device. CMOS stands for complementary metal-oxide-semiconductor.

The radar sensor 132 is a millimeter-wave radar sensor, a submillimeter-wave radar sensor, or a laser radar sensor configured to transmit and receive radar waves and is mounted in a front surface portion of a vehicle body of the own vehicle. The radar sensor 132 is configured to output a signal corresponding to a position and a relative speed of a reflection point. The "reflection point" is a point at which a radar wave is estimated to have been reflected on the surface of an object present around the own vehicle. The "relative speed" is a relative speed of a reflection point, that is, an object having reflected a radar wave, with respect to the own vehicle.

(Locator)

The locator 14 is configured to determine highly accurate position information or the like of the own vehicle by so-called complex positioning. Specifically, the locator 14 includes a GNSS receiver 141, an inertial acquisition unit 142, a high-precision map DB 143, and a locator ECU 144. GNSS stands for global navigation satellite system. DB stands for database. The "highly accurate position information" is, for example, position information of SAE Level 2 or higher and having position accuracy to such an extent that the position information can be used for advanced driving assistance or autonomous driving, specifically, an error is less than 10 cm.

The GNSS receiver 141 is provided to receive positioning signals transmitted from a plurality of positioning satellites, that is, artificial satellites. In the present embodiment, the GNSS receiver 141 is configured to be able to receive a positioning signal from a positioning satellite in at least one of satellite positioning systems such as GPS, QZSS, GLONASS, Galileo, IRNSS, and the BeiDou Navigation Satellite System. GPS stands for Global Positioning System. QZSS stands for Quasi-Zenith Satellite System. GLONASS stands for Global Navigation Satellite System. IRNSS stands for Indian Regional Navigation Satellite System.

The inertial acquisition unit 142 is configured to acquire acceleration and angular velocity acting on the own vehicle. In the present embodiment, the inertial acquisition unit 142 is provided as a three-axis gyro sensor and a three-axis acceleration sensor built in a box-shaped housing of the locator 14.

The high-precision map DB 143 is mainly configured by a nonvolatile rewritable memory so as to store high-precision map information in a rewritable manner and to hold the stored contents even during power interruption. The nonvolatile rewritable memory is, for example, a hard disk, an EEPROM, a flash ROM, or the like. EEPROM stands for electronically erasable and programmable ROM. ROM stands for read-only memory. The high-precision map information may also be referred to as high-precision map data. The high-precision map information includes map information with higher precision than map information used in a conventional car navigation system corresponding to a position error of about several meters. Specifically, the high-precision map DB 143 stores information that can be used for advanced driving assistance or autonomous driving, such as three-dimensional road shape information, lane number information, and regulation information, conforming to a predetermined standard such as the ADASIS standard. ADASIS stands for Advanced Driver Assistance Systems Interface Specification.

The locator ECU 144 is configured as a so-called in-vehicle microcomputer including a CPU, a ROM, a RAM, an input/output interface, and the like (not illustrated). CPU stands for central processing unit. RAM stands for random-access memory. The locator ECU 144 is configured to sequentially determine the position, the direction, and the like of the own vehicle on the basis of the positioning signal received by the GNSS receiver 141, the acceleration and the angular velocity acquired by the inertial acquisition unit 142, the traveling speed acquired from the vehicle state sensor 11, and the like. The locator 14 is provided to be able to provide the determination result of the position, the direction, and the like by the locator ECU 144 to each unit such as the navigation device 16, the driving control ECU 17, and the HMI control device 23 via the in-vehicle communication line 10A.

(DCM)

The DCM 15 is an in-vehicle communication module and is provided to be able to perform information communication with a base station around the own vehicle by wireless communication conforming to a communication standard such as LTE or 5G. LTE stands for Long Term Evolution. 5G stands for fifth generation. Specifically, for example, the DCM 15 is configured to obtain the latest high-precision map information from a probe server on a cloud. Further, the DCM 15 stores the acquired latest high-precision map information into the high-precision map DB 143 in cooperation with the locator ECU 144. Moreover, the DCM 15 is configured to acquire traffic information such as congestion information from the probe server and/or a predetermined database described above. The traffic information is also referred to as "road traffic information".

(Navigation Device)

The navigation device 16 is provided to calculate a scheduled traveling route from the current position of the own vehicle to a predetermined destination. In the present embodiment, the navigation device 16 is configured to calculate the scheduled traveling route on the basis of a destination set by the driver or the like of the own vehicle, high-precision map information acquired from the locator 14, and position information and direction information of the own vehicle acquired from the locator 14. The navigation device 16 is provided to be able to provide various information including route information as a calculation result to each unit such as the driving control ECU 17 and the HMI control device 23 via the in-vehicle communication line 10A. That is, the navigation device 16 performs navigation screen display for map display, route display, and the like on the HMI device 20.

(Driving Control ECU)

The driving control ECU 17 is provided to control the driving of the own vehicle on the basis of signals and information acquired from the vehicle state sensor 11, the external state sensor 12, the surrounding monitoring sensor 13, the locator 14, and the like. That is, the driving control ECU 17 is configured to perform a predetermined driving control operation. In the present embodiment, the "predetermined driving control operation" is a vehicle control operation, that is, a dynamic driving task execution operation, corresponding to SAE Levels 1 to 3. The definition of the "dynamic driving task" conforms to "SAE J3016". That is, the "dynamic driving task" is all operational and tactical functions that need to be performed in real time at the time of operating a vehicle in road traffic, excluding strategic functions. The "strategic function" is a traveling plan, waypoint selection, and the like.

The driving control ECU 17 as a driving control device of the present disclosure is configured to control the driving of a vehicle capable of autonomous driving at SAE Level 3 during traveling in a specific section and/or traffic congestion. The "specific section" is a traveling section, set in advance so that the autonomous driving at SAE Level 3 is possible. In the specific section, the own vehicle can travel in a predetermined high-speed range during autonomous driving. The predetermined high-speed range is, for example, 60 km/h or more and a legal speed or less. Such autonomous driving at SAE Level 3 in which traveling in the high-speed range is possible in the specific section is hereinafter referred to as "high-speed range autonomous driving". On the other hand, the autonomous driving at SAE Level 3 executed during traffic congestion is hereinafter referred to as "autonomous driving in traffic congestion". In the autonomous driving at SAE Level 3, there is no obligation for the driver to monitor the surroundings of the own vehicle.

The driving control ECU 17 has a configuration as a so-called in-vehicle microcomputer including a CPU, a ROM, a nonvolatile rewritable memory, a RAM, an input/output interface, and the like (not illustrated). Specifically, the driving control ECU 17 includes an information acquisition unit 171, a driving level determination unit 172, and a vehicle speed control unit 173 as functional configurations or functional units achieved on the in-vehicle microcomputer.

The information acquisition unit 171 is provided to acquire at least the traveling state of the own vehicle. The "traveling state" includes a driving state, a natural environment, a traffic environment, and the like detected or acquired by the vehicle state sensor 11, the external state sensor 12, the surrounding monitoring sensor 13, and the like. The information acquisition unit 171 is provided to acquire the current position of the own vehicle and traffic information concerning a road on which the own vehicle is currently traveling. That is, the information acquisition unit 171 acquires information necessary for vehicle control corresponding to SAE Levels 1 to 3 from the vehicle state sensor 11, the external state sensor 12, the surrounding monitoring sensor 13, the locator 14, the DCM 15, and the like.

The driving level determination unit 172 is provided to determine the executability of the autonomous driving on the basis of the traveling state or the like acquired by the information acquisition unit 171. That is, the driving level determination unit 172 sets the driving autonomy level in the own vehicle to any one of SAE Levels 0 to 3. Specifically, the driving level determination unit 172 determines whether or not the autonomous driving start condition is satisfied, and starts the autonomous driving at SAE Level 3 when receiving the driver's approval operation while the condition is satisfied. When the autonomous driving continuation condition is not satisfied during the execution of the autonomous driving at SAE Level 3, the driving level determination unit 172 performs control necessary for terminating the autonomous driving. The driving control ECU 17 is provided to be able to provide the setting result of the driving autonomy level by the driving level determination unit 172 to each unit such as the HMI control device 23 via the in-vehicle communication line 10A.

The vehicle speed control unit 173 is provided to control the traveling speed of the own vehicle in accordance with the executability of the autonomous driving determined by the driving level determination unit 172. Specifically, when the driving autonomy level is set to any one of SAE Levels 1 to 3, the vehicle speed control unit 173 performs the traveling speed control corresponding to the set driving autonomy level. The driving control ECU 17 is also provided with a steering control unit, a braking control unit, and the like (not illustrated) that perform steering control, braking control, and the like corresponding to the set driving autonomy level. That is, the driving control ECU 17 has a configuration as a vehicle control unit that executes vehicle motion control subtasks, such as vehicle speed control, steering control, and braking control, corresponding to the driving autonomy level determined by the driving level determination unit 172.

(DSM)

The DSM 18 is configured to detect the state of the driver by image recognition based on an image captured by an in-vehicle camera including an image sensor such as a CCD or a CMOS. Further, the DSM 18 is configured to issue a warning or the like concerning inattentive driving or the like by using a speaker (not illustrated) or the like provided on a dashboard or the like on the basis of the detection result of the state of the driver. Moreover, the DSM 18 is provided to be able to provide the detection result of the state of the driver to each unit such as the driving control ECU 17 and the HMI control device 23 via the in-vehicle communication line 10A.

(Operation Unit)

The operation unit 19 is configured to receive the manual input operation of the driver except for a motion control input in the own vehicle. The "motion control input" is a control input directly related to motion control in the lateral direction or the longitudinal direction during the manual driving of the own vehicle and is specifically, for example, a shift operation, an accelerator operation, a brake operation, a steering operation, and the like. The operation of the indicator switch 191 in the lane change function, included in SAE Level 2 and linked with the operation of the indicator switch 191, is different from the "motion control input" described above.

Specifically, the operation unit 19 includes an indicator switch 191. The indicator switch 191 is configured to output a signal corresponding to an operation state of an indicator lever (not illustrated) that is an operation lever provided in the steering column. Further, the operation unit 19 includes a steering switch (not illustrated) provided on a spoke portion of the steering wheel. Moreover, the operation unit 19 includes a seat position adjustment switch, a seating posture adjustment switch, a window opening/closing switch, and the like provided corresponding to each occupant's seat including the driver's seat. The operation unit 19 is provided to be able to provide a result of receiving an input operation by the driver to each unit such as the driving control ECU 17 and the HMI control device 23 via the in-vehicle communication line 10A.

(Hmi Device)

The HMI device 20 is provided to at least visually present various information concerning the own vehicle to the driver and to receive an input operation of the driver corresponding to the presentation contents. In the present embodiment, the HMI device 20 mounted in the own vehicle capable of autonomous driving is configured to be able to present various information concerning the autonomous driving and receiving an input operation by the driver. The "information presentation" is, for example, various types of guidance, an input operation instruction, an input operation content notification, a warning, and the like.

As described above, the HMI device 20 includes the meter panel 21 and the CID device 22 provided on the dashboard (not illustrated). That is, in the present embodiment, the HMI device 20 has a configuration as a so-called "dashboard HMI" attached to a dashboard (not illustrated). The HMI device 20 includes a speaker (not illustrated) for performing information presentation by voice.

The meter panel 21 includes a meter 211, a meter display 212, and a meter switch 213. The meter 211 is provided to perform meter display of the traveling speed of the own vehicle, the cooling water temperature, the remaining fuel amount, and the like. The meter display 212 is an information display unit provided at the center of the meter panel 21 and is provided to perform various information displays of date and time, an outside temperature, a traveling distance, a radio receiving station, and the like. The meter switch 213 is provided to be able to receive various operations concerning a display state or display contents in the meter 211 and/or the meter display 212, for example, a reset operation of a trip meter.

The CID device 22 is provided on a dashboard. The CID device 22 is provided to be able to display a navigation display screen for map display, route display, and the like by the navigation device 16. The CID device 22 is provided to be able to also display information and contents different from those of the navigation display screen. Specifically, the CID device 22 is configured to be able to perform display related to a traveling mode, such as "comfort", "normal", "sports", and "circuit". The CID device 22 is configured to be able to perform display related to a second task that can be executed by the driver during the autonomous driving at SAE Level 3.

The CID device 22 includes a CID display 221, an input device 222, and a CID switch 223. The CID display 221 is provided substantially at the center of the dashboard in the vehicle width direction so as to be visually recognizable from at least the driver. The CID display 221 has a configuration as a display device that is a liquid crystal display or an organic EL display. EL stands for electroluminescence.

The input device 222 is a transparent touch panel and is provided to cover the CID display 221. That is, the input device 222 is configured to receive an input operation by the driver or the like while causing the driver or the like to visually recognize the display on the CID display 221. The CID switch 223 includes a plurality of manual operation switches disposed around the CID display 221 and the input device 222.

Figure 2:
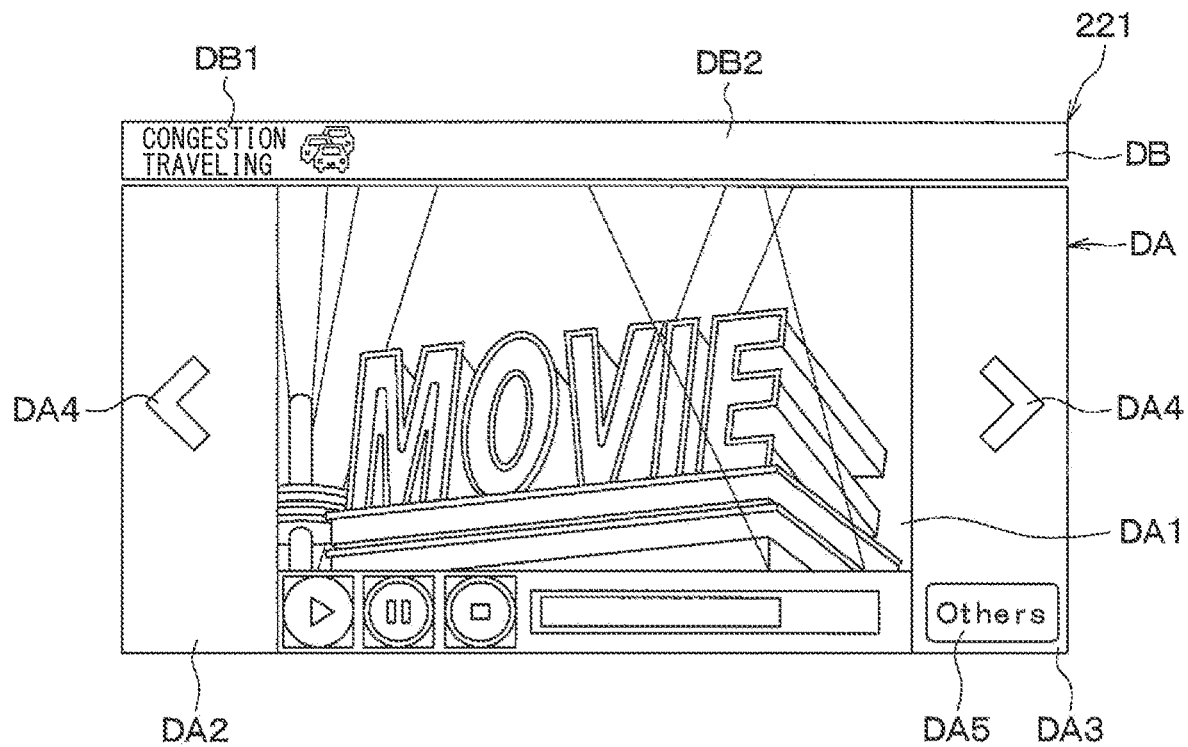
FIG. 2 is a schematic diagram illustrating an example of a display mode in the HMI device illustrated in FIG. 1.
Figure 3:
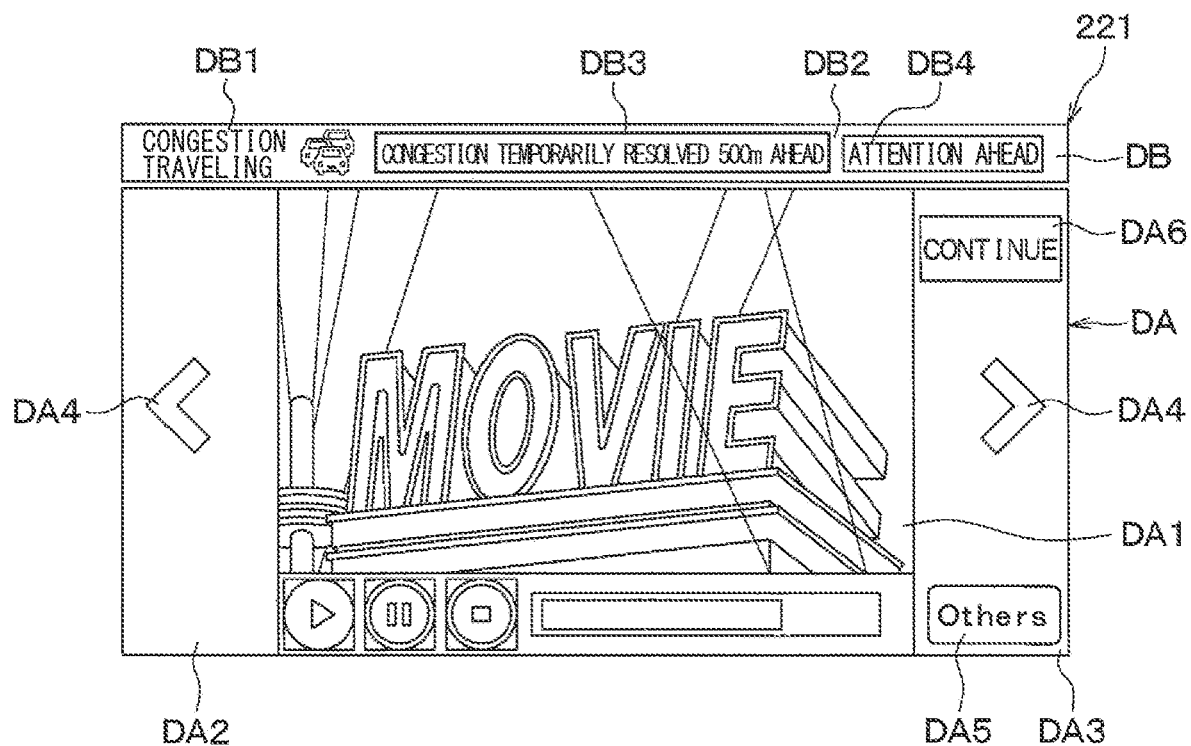
FIG. 3 is a schematic diagram illustrating another example of the display mode in the HMI device illustrated in FIG. 1.
Figure 4:
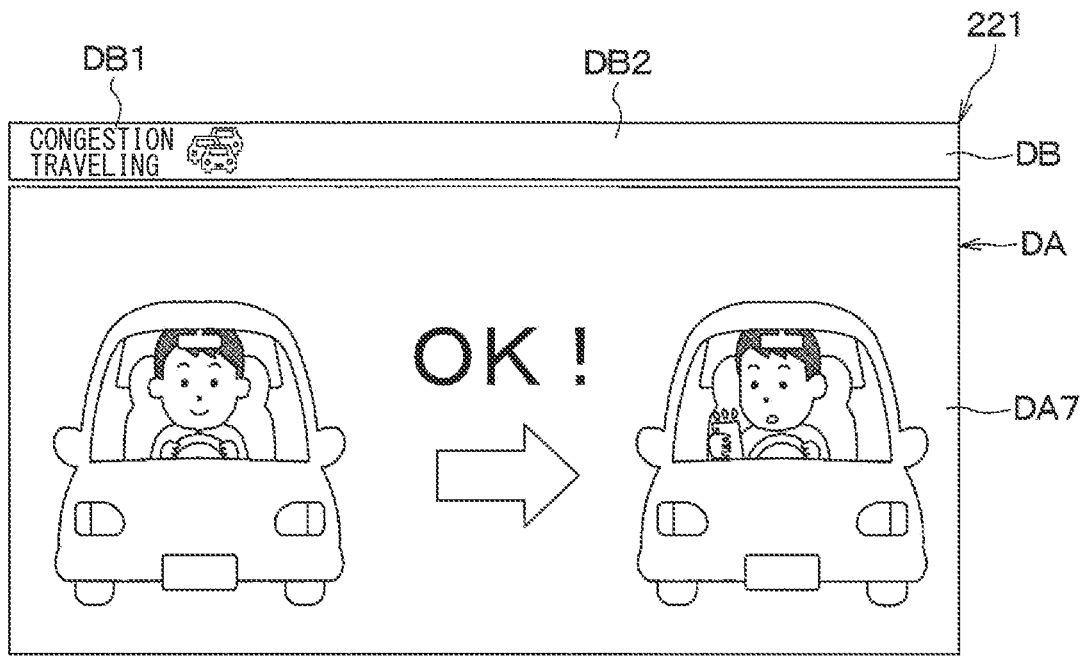
FIG. 4 is a schematic diagram illustrating still another example of the display mode in the HMI device illustrated in FIG. 1.
Figure 5:
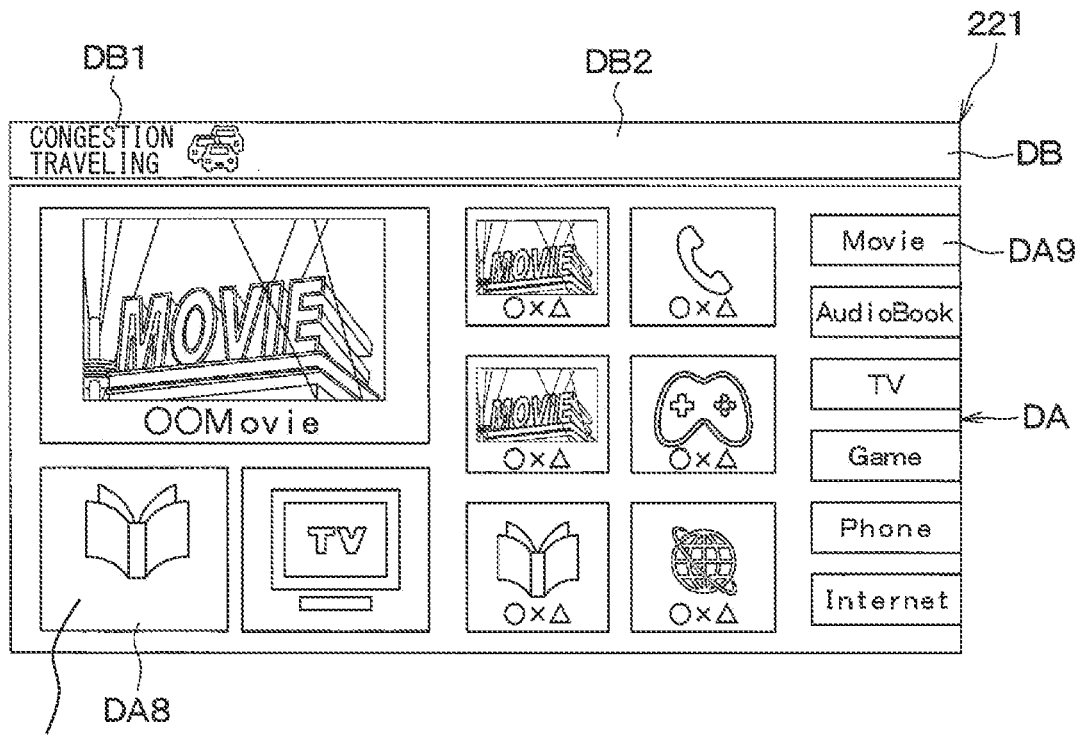
FIG. 5 is a schematic diagram illustrating still another example of the display mode in the HMI device illustrated in FIG. 1.

FIGS. 2 to 5 illustrate display screen examples related to a second task during autonomous driving on the CID display 221. FIGS. 2 and 3 illustrate a case where a movie which is an example of long-time content is being viewed. FIG. 4 illustrates a case where the performance of a mobile communication terminal operation which is an example of short-time content is permitted. FIG. 5 illustrates a menu screen on which a plurality of pieces of content having different required execution durations is presented in a selectable manner.

The "long-time content" is content having a relatively long required execution duration (e.g., 30 minutes or more) among the registered content. The "registered content" is content registered or made available in advance by a manufacturer of the own vehicle or a user of the own vehicle including a driver and is available as a second task. The "short-time content" is content having a shorter required execution duration (e.g., less than 30 minutes) than that of the long-time content among the registered content. The "content" is, for example, video content, text content, or the like. The "video content" is, for example, a movie, a concert video, a music video, a television broadcast, a game, a television phone, or the like. The "character content" is, for example, a book, a magazine, a character broadcast, or the like.

Referring to FIGS. 2 to 5, the display screen of the CID display 221 includes a first display area DA and a second display area DB. The first display area DA is an area where video content and character content are mainly displayed on a relatively large screen and may also be referred to as a "main display area".

The second display area DB is provided above the first display area DA in the vertical direction of the screen. The "vertical direction of the screen" is a vertical direction with respect to a driver or the like facing the CID display 221 and is the vertical direction in FIGS. 2 to 5. The second display area DB is a display area provided at the top of the display screen of the CID display 221 and can display various character information such as traffic information. The second display area DB may also be referred to as an "information display bar". The second display area DB may be provided anywhere within the display screen of the CID display 221. The second display area DB may be provided in a display device adjacent to the CID display 221.

Referring to FIGS. 2 and 3, the first display area DA includes a central display area DA1, a left margin area DA2, and a right margin area DA3. The central display area DA1 is an area for displaying video content and character content and is provided between the left margin area DA2 and the right margin area DA3 in the horizontal direction of the screen. The "horizontal direction of the screen" is a horizontal direction with respect to the driver or the like facing the CID display 221, and is the horizontal direction in FIGS. 2 to 5.

The Left margin area DA2 is provided on the left side of the central display area DA1 in the horizontal direction of the screen. In the left margin area DA2, an arrow-shaped type change button DA4 is provided. The type change button DA4 is an operation button operated to change the type of content among a movie, a music video, a television broadcast, a game, a book, and the like and is disposed substantially at the center of the left margin area DA2.

The right margin area DA3 is provided on the right side of central display area DA1 in the horizontal direction of the screen. The type change button DA4 is also provided in the right margin area DA3. The type change button DA4 is disposed substantially at the center of the right margin area DA3. The type change button DA4 in the right margin area DA3 is provided to be operated to change the type of content in the reverse order of the type change button DA4 in the left margin area DA2.

The right margin area DA3 is also provided with a content change button DA5. The content change button DA5 is an operation button operated to change the content in the same-time category and is disposed at the lower end of the right margin area DA3 in the vertical direction of the screen. The "time category" is a type of content being either the short-time content or the long-time content.

As illustrated in FIG. 3, an approval button DA6 is displayed in the right margin area DA3 as necessary. The approval button DA6 is an operation button operated to receive various approval operations by the driver and is disposed at the upper end of the right margin area DA3 in the vertical direction of the screen. The approval button DA6 displays character strings such as "OK", "START", and "CONTINUE" inside a rectangular button shape in accordance with the content of the approval operation.

The second display area DB includes a status display area DB1 and an information display area DB2. The status display area DB1 is provided at the left end in the horizontal direction of the screen so as to display information corresponding to the driving autonomy level of the own vehicle at the present time. The information displayed in the status display area DB1 is, for example, "exclusive-section traveling" in the case of the high-speed range autonomous driving, and "congestion traveling" in the case of the autonomous driving in traffic congestion.

The information display area DB2 is provided on the right side of the status display area DB1 in the horizontal direction of the screen. The information display area DB2 displays various information and messages concerning the traffic information and the driving state in characters as necessary. Specifically, the display in the information display area DB2 includes an information display box DB3 and a message display box DB4. The information display box DB3 displays traffic information such as congestion information. The message display box DB4 displays various messages or warnings except for the traffic information.

Referring to FIG. 4, in a case where the operation of a mobile communication terminal such as a mobile phone is permitted as a second task, the first display area DA displays a mobile terminal permission screen DA7. The mobile terminal permission screen DA7 is configured by the display of characters and/or images indicating that the driver is permitted to operate the mobile communication terminal. Also, in the display screen illustrated in FIG. 4, the second display area DB has the same display function as described above. The CID display 221 displays the menu screen illustrated in FIG. 5 when the input device 222 detects that an arbitrary portion on the mobile terminal permission screen DA7 has been touched.

Referring to FIG. 5, on the menu screen, the first display area DA displays a plurality of content selection buttons DA8 and a plurality of type selection buttons DA9. The content selection button DA8 presents individual content having a high use frequency in each content type such as a movie, a concert video, a television broadcast, and a game by thumbnail display. The type selection button DA9 is provided corresponding to each content type such as a movie, a concert video, a television broadcast, and a game. Also, in the menu screen illustrated in FIG. 5, the second display area DB has the same display function as described above.

(HMI Control Device)

Referring again to FIG. 1, the HMI control device 23 is configured to control the operation of the HMI device 20. That is, the HMI control device 23 is configured as an HCU that controls the operations of the meter panel 21, the CID device 22, and the like included in the HMI device 20. HCU stands for HMI control unit.

The HMI control device 23 has a configuration as a so-called in-vehicle microcomputer including a CPU, a ROM, a nonvolatile rewritable memory, a RAM, an input/output interface, and the like (not illustrated). The HMI control device 23 includes a vehicle information acquisition unit 231, a behavior acquisition unit 232, a time acquisition unit 233, a second task presentation unit 234, a continuation operation reception unit 235, and a display control unit 236 as functional configurations or functional units achieved on a microcomputer.

The vehicle information acquisition unit 231 acquires the traveling state of the own vehicle detected or acquired by the vehicle state sensor 11 or the like. Further, the vehicle information acquisition unit 231 acquires the current position of the own vehicle, a scheduled traveling route, and traffic information in the scheduled traveling route including a road on which the own vehicle is currently traveling. Moreover, the vehicle information acquisition unit 231 acquires the determination result of the driving autonomy level by the driving level determination unit 172 from the driving control ECU 17.

The behavior acquisition unit 232 is provided to acquire the detection result of the behavior of the driver. That is, the behavior acquisition unit 232 acquires the behavior detection result by the DSM 18 from the DSM 18 via the in-vehicle communication line 10A. The behavior acquisition unit 232 may acquire the behavior detection result by operating the input device 222.

The time acquisition unit 233 is provided to acquire the possible duration for the autonomous driving on the basis of the content acquired in the vehicle information acquisition unit 231. Specifically, in a case where the own vehicle travels in a specific section that is a traveling section, set in advance so that the autonomous driving is possible, the time acquisition unit 233 acquires the possible duration on the basis of the distance of the specific section. On the other hand, when the autonomous driving is started due to traffic congestion, the time acquisition unit 233 acquires the possible duration on the basis of the predicted duration of the traffic congestion.

The second task presentation unit 234 is provided to present, by the HMI device 20, a second task that can be executed by the driver during autonomous driving on the basis of the possible duration acquired by the time acquisition unit 233. That is, the second task presentation unit 234 displays any one of the long-time content presentation screen, the short-time content presentation screen, and the menu screen on the CID display 221 in accordance with the acquisition result of the possible duration. The "long-time content presentation screen" and the "short-time content presentation screen" are display screens corresponding to FIGS. 2 and 3. That is, the long-time content presentation screen is a display screen in which one of the pieces of long-time content that can be terminated within the possible duration is presented or displayed in the central display area DA1. On the other hand, the short-time content presentation screen is a display screen on which one of the pieces of short-time content that can be terminated within the possible duration is presented or displayed in the central display area DA1. The second task presentation unit is also referred to as a presentation unit.

Specifically, in the present embodiment, the second task presentation unit 234 displays the short-time content presentation screen on the CID display 221 when the acquired possible duration is less than a predetermined threshold. On the other hand, the second task presentation unit 234 displays the long-time content presentation screen on the CID display 221 when the acquired possible duration is equal to or more than the predetermined threshold. When the time acquisition unit 233 cannot acquire the possible duration of some reason, the second task presentation unit 234 displays the menu screen on the CID display 221 so as to selectably present a plurality of second tasks having different required execution duration.

The continuation operation reception unit 235 is provided to receive a continuation operation that is an input operation for continuing the second task being executed in a case where the temporary resolution of the traffic congestion is detected. "The case where the temporary resolution of the traffic congestion is detected" is, for example, a case where the current position of the own vehicle exists in a congestion section based on the acquired congestion information, and the surrounding monitoring sensor 13 detects an acceleratable section ahead of the own vehicle by a predetermined distance or more. Alternatively, "the case where the temporary resolution of the traffic congestion is detected" is, for example, a case where it is detected that the current position of the own vehicle exists in a congestion section based on the acquired congestion information, and the vehicle speed of the own vehicle is equal to or higher than a predetermined resolution lower-limit vehicle speed (e.g., 10 km/h) and lower than a predetermined resolution upper-limit vehicle speed (e.g., 60 km/h). When the vehicle speed of the own vehicle is equal to or higher than the resolution upper-limit vehicle speed, it is detected that the traffic congestion has been completely resolved, and the driving autonomy level becomes a driving autonomy level at which the second task cannot be executed.

Specifically, when the temporary resolution of the traffic congestion is detected, the continuation operation reception unit 235 displays traffic information indicating the temporary resolution of the traffic congestion in the information display box DB3 and displays the approval button DA6. The continuation operation reception unit 235 detects whether or not a continuation operation, that is, a touch input operation on the input device 222, has been performed at a position corresponding to the display position of the approval button DA6.

Further, in the present embodiment, when the temporary resolution of the traffic congestion is detected, the continuation operation reception unit 235 displays, in the message display box DB4, a message of "ATTENTION AHEAD" for causing the driver to check the road condition ahead, that is, in a place to which the own vehicle is going. The continuation operation reception unit 235 enables the continuation operation when the behavior acquisition unit 232 acquires a detection result indicating that the driver is checking a road condition in a place to which the vehicle is going. Moreover, when enabling the reception of the continuation operation, the continuation operation reception unit 235 notifies the driving control ECU 17 that the continuation operation has been enabled in order to cause the driving control ECU 17 to control the traveling speed of the own vehicle so as not to exceed a predetermined speed range.

The display control unit 236 is provided to perform display control except for the display control in the second task presentation unit 234 and the continuation operation reception unit 235. Specifically, for example, the display control unit 236 causes the latest information to be displayed in the information display box DB3 when traffic information, such as congestion information, changes. Further, the display control unit 236 performs various display controls by the CID device 22 at the driving autonomy level of SAE Levels 0 to 2 at which the second task cannot be executed.

(Outline of Operation: First Embodiment)

Hereinafter, the operation of the driving control ECU 17 and the HMI control device 23 according to the present embodiment, and the outline of the method and the program executed by these will be described together with the effects obtained by the configuration of the present embodiment.

The information acquisition unit 171 in the driving control ECU 17 acquires various information including the traveling state of the own vehicle. Specifically, the information acquisition unit 171 acquires the driving state and the traffic environment from the vehicle state sensor 11, the external state sensor 12, and the surrounding monitoring sensor 13. Further, the information acquisition unit 171 acquires, from the locator 14, highly accurate position information of the own vehicle and traffic regulation information and the like at the own vehicle position and its surroundings. Moreover, the information acquisition unit 171 acquires the scheduled traveling route from the current position of the own vehicle to a predetermined destination from the navigation device 16.

The information acquisition unit 171 acquires the congestion state as the traveling state from the surrounding monitoring sensor 13 and the DCM 15. The "congestion state" is the state of occurrence of traffic congestion in a place to which the own vehicle is going in the scheduled traveling route of the own vehicle. That is, the "congestion state" includes, for example, congestion head position, congestion end position, traffic congestion length, and the like in the scheduled traveling route of the own vehicle. The "congestion state" includes whether or not the own vehicle has entered traffic congestion, whether or not the traffic congestion has been temporarily resolved, and the like.

The information acquisition unit 171 acquires the state of the driver from the DSM 18. Further, the information acquisition unit 171 acquires the state of the operation of the operation unit 19 by the driver from the operation unit 19. Moreover, the information acquisition unit 171 acquires the state of the execution of the second task by the driver from the HMI control device 23.

The driving level determination unit 172 determines the executability of the autonomous driving on the basis of various information such as the traveling state acquired by the information acquisition unit 171. Specifically, the driving level determination unit 172 determines the start condition for the driving autonomy level corresponding to SAE Levels 1 to 3 on the basis of various information acquired by the information acquisition unit 171. For example, in the present embodiment, the start condition for the autonomous driving of SAE Level 3 includes that the own vehicle is traveling in a specific section or is in traffic congestion, that the own vehicle is in a traffic environment where autonomous driving is possible, and the like. "A traffic environment where autonomous driving is possible" includes, for example, that it is possible to satisfactorily check the traffic environment by various sensors or visual inspection, that there is no obstacle such as an accident or road construction in a scheduled autonomous driving section, and the like.

The driving control ECU 17 performs vehicle speed control, steering control, braking control, and the like in accordance with the executability of the autonomous driving determined by the driving level determination unit 172. For example, the vehicle speed control unit 173 controls the traveling speed of the own vehicle in accordance with the executability of the autonomous driving determined by the driving level determination unit 172. Specifically, during the autonomous driving at SAE Level 3, the vehicle speed control unit 173 controls the traveling speed of the own vehicle so as to keep the traveling speed of the own vehicle within a predetermined speed range and ensure a predetermined distance from a preceding vehicle in accordance with the traveling speed. Moreover, during the autonomous driving at SAE Level 3, the driving control ECU 17 performs steering control so that the own vehicle does not deviate from a lane in which the own vehicle is currently traveling.

In order for driving level determination unit 172 to set the driving autonomy level to SAE Level 3, a driver's approval operation using HMI device 20 is required. Therefore, the HMI device 20 presents various information concerning the autonomous driving and receives the operation of the driver corresponding to the presented information.

Specifically, when the start condition for the autonomous driving at SAE Level 3 is satisfied, the HMI control device 23 causes the meter panel 21 and the CID display 221 to display that the autonomous driving can be executed. The HMI control device 23 causes the CID display 221 to display a Run button for approving the execution of the autonomous driving and starting the autonomous driving of the own vehicle, and a Not Run button for not approving the execution of the autonomous driving and avoiding the start of the autonomous driving of the own vehicle.

The HMI control device 23 monitors the operation state of the input device 222 to determine whether or not either the Run button or the Not Run button has been selected and operated within a predetermined time. When either the Run button or the Not Run button is selected and operated within a predetermined time, the HMI control device 23 erases the display of both buttons and notifies the driving control ECU 17 of the operation reception result, that is, transmits the operation reception result to the driving control ECU 17. When neither the Run button nor the Not Run button has been selected or operated within the predetermined time, the HMI control device 23 performs processing similar to the case where the Not Run button has been selected and operated. Instead of operating the input device 222, the driver may operate an input button, such as a steering switch, provided on the steering wheel to select whether or not to execute the autonomous driving.

As described above, the autonomous driving at SAE Level 3 is started by the selection operation of the Run button or the like. Then, the operation by the driver makes it possible to execute the second task. The HMI control device 23 causes the CID display 221 to display content available as the second task so that the driver can select and operate the content. Such content can be registered in advance by a user of the own vehicle including the current driver, for example. Further, such content can be provided from the server by V2X communication using the DCM 15. V2X stands for Vehicle to X.

The HMI control device 23 monitors the operation state of the input device 222 to receive the selection operation by the driver. When the driver performs the selection operation on the content presented, that is, displayed, on the CID display 221, the use of the content on which the selection operation has been performed is started.

Meanwhile, the required execution duration for the second task varies. That is, for example, when a mobile communication terminal such as a mobile phone is operated, the required execution duration is relatively short. In contrast, in the case of movie watching, the required execution duration may be long.

For example, there may be a case where a second task executable time, that is, the possible duration for the autonomous driving, is a relatively short time of about 30 minutes. In such a case, when the content presented on the CID display 221 is only a movie, a required time for which is one hour or more, the driver who is the user may feel inconvenience. This is because the movie indicating ends halfway.

In contrast, for example, there may be a case where the second task executable time is a relatively long time of one hour or more. In such a case, when the content presented on the CID display 221 is only a music video, a required time for which is about five minutes, the driver who is the user may feel inconvenience. This is because the content selection operation needs to be repeatedly performed many times.

On the other hand, in many cases, the second task executable time can be predicted in advance with a certain degree of accuracy. That is, for example, in the case of the high-speed range autonomous driving, the distance of the specific section where the autonomous driving is possible is known. Therefore, in the case of high-speed range autonomous driving, it is possible to estimate the possible duration for the autonomous driving. Further, for example, in the case of autonomous driving in traffic congestion, the possible duration for the autonomous driving, that is, the predicted duration of the traffic congestion, can be estimated on the basis of the average traveling speed of the own vehicle during traffic congestion and the congestion distance acquired from congestion information. Alternatively, for example, the predicted duration of the traffic congestion can be directly acquired or read from congestion information "CONGESTION min BETWEEN ABC INTERCHANGE AND XYZ INTERCHANGE". The second task executable time can be predicted on the basis of the estimated value of the possible duration for the autonomous driving.

Therefore, the HMI control device 23 acquires the possible duration for the autonomous driving by the time acquisition unit 233. The HMI control device 23 presents a second task executable by the driver during autonomous driving by the HMI device 20 on the basis of the possible duration acquired by the time acquisition unit 233.

Specifically, the vehicle information acquisition unit 231 acquires the traveling state of the own vehicle detected or acquired by the vehicle state sensor 11 or the like. Further, the vehicle information acquisition unit 231 acquires the current position of the own vehicle, a scheduled traveling route, and traffic information in the scheduled traveling route including a road on which the own vehicle is currently traveling.

The time acquisition unit 233 acquires the possible duration for the autonomous driving on the basis of the content acquired in the vehicle information acquisition unit 231. The second task presentation unit 234 presents, by the HMI device 20, a second task that can be executed by the driver during autonomous driving on the basis of the possible duration acquired by the time acquisition unit 233.

As described above, according to the HMI control device 23 of the present embodiment and the HMI control method and the HMI control program executed by the HMI control device, the following effects are obtained. That is, for example, it is possible to present, to the driver, second task content suitable for the second task executable time, that is, the possible duration for the autonomous driving. In other words, it is possible to present to the driver second task content, the required execution duration for which corresponds to a cause or status that has made the autonomous driving possible. Hence it is possible to make the second task available more comfortably during autonomous driving.

For example, there may be a case where the own vehicle enters traffic congestion while traveling in a traveling section outside a specific section on an expressway having a minimum speed limit. There may be a case where the own vehicle enters traffic congestion while traveling on a general road having no minimum speed limit. There may be a case where traffic congestion occurs due to an accident, construction, or the like in a specific section on the expressway having the minimum speed limit. In these cases, the start condition for the high-speed range autonomous driving, in which traveling in a predetermined high-speed range is possible, may not be satisfied.

On the other hand, even in these cases, since the own vehicle is in traffic congestion, it is possible to satisfy the start condition for the autonomous driving in traffic congestion in which traveling in a predetermined medium-to-low-speed range, for example, less than 10 km/h, is possible. Therefore, in these cases, when other conditions included in the start condition are satisfied, the second task can be used by executing the autonomous driving at SAE Level 3 in traffic congestion. Therefore, in the present embodiment, the driving level determination unit 172 determines the execution of the autonomous driving in traffic congestion when the own vehicle is traveling on the expressway on which the minimum speed limit included in the predetermined speed range in the autonomous driving in traffic congestion is set and in traffic congestion. There is also a driving control ECU 17 that continues high-speed range autonomous driving without shifting to the autonomous driving in traffic congestion when the own vehicle enters traffic congestion in the high-speed range autonomous driving. When the own vehicle enters the traffic congestion in the high-speed range autonomous driving, the driving control ECU 17 controls the traveling speed of the own vehicle only so as to only ensure the distance from the preceding vehicle. As a result, the second task is continued.

As in the above example, there may be a case where traffic congestion is temporarily resolved after the autonomous driving at SAE Level 3 in traffic congestion has been executed to start the use of the second task. In such a case, when the own vehicle reaches the temporary resolution section of the traffic congestion, the speed-increase control of the own vehicle is performed. The "speed-increase control" may also be referred to as "speed-increase control on the acceleration side", "speed-increase control in the acceleration direction", or simply "acceleration control". Thereafter, when the own vehicle reaches the end of the traffic congestion again, the own vehicle is subjected to deceleration control.

In the scene of temporary resolution of the traffic congestion as described above, when the traveling speed temporarily exceeds the upper speed limit of the autonomous driving in traffic congestion by the speed-increase control of the own vehicle, the continuation condition for the autonomous driving in traffic congestion is not satisfied. Then, the driving autonomy level is changed from SAE Level 3 to SAE Level 2 at the time of traffic congestion, disabling the use of the second task. However, by the subsequent re-entry into a congestion section, it becomes possible to use the autonomous driving at SAE Level 3 in traffic congestion and the second task associated with the autonomous driving.

As described above, when the autonomous driving in traffic congestion is temporarily interrupted by the speed-increase control of the own vehicle in the scene of temporary resolution of the traffic congestion, the use of the second task is also temporarily interrupted, which is not convenient. Therefore, when the temporary resolution of the traffic congestion is detected, the driving control ECU 17 and the HMI control device 23 perform processing necessary for continuing the autonomous driving in traffic congestion and the use of the second task associated with the autonomous driving during the temporary resolution of the traffic congestion.

Specifically, when the temporary resolution of the traffic congestion is detected, the continuation operation reception unit 235 in the HMI control device 23 receives a continuation operation that is an input operation for continuing the second task being executed. The HMI control device 23 transmits to the driving control ECU 17 the reception result of the continuation operation by the continuation operation reception unit 235.

The information acquisition unit 171 in the driving control ECU 17 acquires the congestion state. Further, the information acquisition unit 171 acquires the state of the execution of the second task by the driver from the HMI control device 23. Moreover, the information acquisition unit 171 acquires the reception state of the continuation operation from the HMI control device 23. That is, the information acquisition unit 171 acquires, from the HMI control device 23, whether or not a continuation request for the second task being executed has been made. When the acquired congestion state is the temporary resolution of the traffic congestion and a continuation request for the second task being executed has been made, the vehicle speed control unit 173 performs the speed-increase control on the traveling speed within a predetermined speed range, that is, within a speed limit range that is faster than the minimum speed limit of the expressway and in which the autonomous driving in traffic congestion is continued.

In the present embodiment, when the driver desires to continue the second task in the scene of temporary resolution of the traffic congestion, it is possible to satisfactorily avoid the autonomous driving in traffic congestion and the temporary interruption of the second task against the driver's desire. Thus, according to the present embodiment, it is possible to make the second task available more comfortably during autonomous driving.

Even when the temporary resolution of the traffic congestion is detected, the autonomous driving in traffic congestion is not necessarily continued as it is. When the autonomous driving in traffic congestion is canceled in association with the temporary resolution of the traffic congestion, it is necessary to smoothly take over the driving from the system to the driver. Therefore, it is desirable that the continuation request operation for the autonomous driving in traffic congestion and the second task, which are being executed, is performed in a state where the driver sufficiently grasps the traffic condition, that is, the road condition, ahead of the own vehicle.

Therefore, in the present embodiment, when the temporary resolution of the traffic congestion is detected, the continuation operation reception unit 235 displays a message of "ATTENTION AHEAD" for causing the driver to check the road condition ahead (i.e., in a place to which the own vehicle is going). Further, the continuation operation reception unit 235 enables the continuation operation when the behavior acquisition unit 232 acquires a detection result indicating that the driver is checking a road condition in a place to which the vehicle is going. Moreover, when enabling the reception of the continuation operation, the continuation operation reception unit 235 notifies the driving control ECU 17 that the continuation operation has been enabled in order to cause the driving control ECU 17 to control the traveling speed of the own vehicle so as not to exceed a predetermined speed range.

When receiving the notification that the continuation operation has been enabled from the continuation operation reception unit 235, the driving control ECU 17 performs processing for continuing the autonomous driving. That is, the driving level determination unit 172 determines the continuation of the autonomous driving when the continuation operation which is the input operation for continuing the second task being executed is effectively received by the HMI device 20 and the continuation request is notified from the HMI device 20. Specifically, when the detection result of the behavior of the driver indicates that a road condition in a place to which the vehicle is going is being checked, the driving level determination unit 172 determines that the continuation operation has been effectively received by the HMI device 20 and determines the continuation of the autonomous driving in traffic congestion.

Operation Example

One specific example of the control operation or the control method and the control program corresponding thereto described above will be described with reference to flowcharts illustrated in FIGS. 6 to 9. In the illustrated flowchart, "S" stands for "step".

(Autonomous Driving Control Process)

Figure 6:
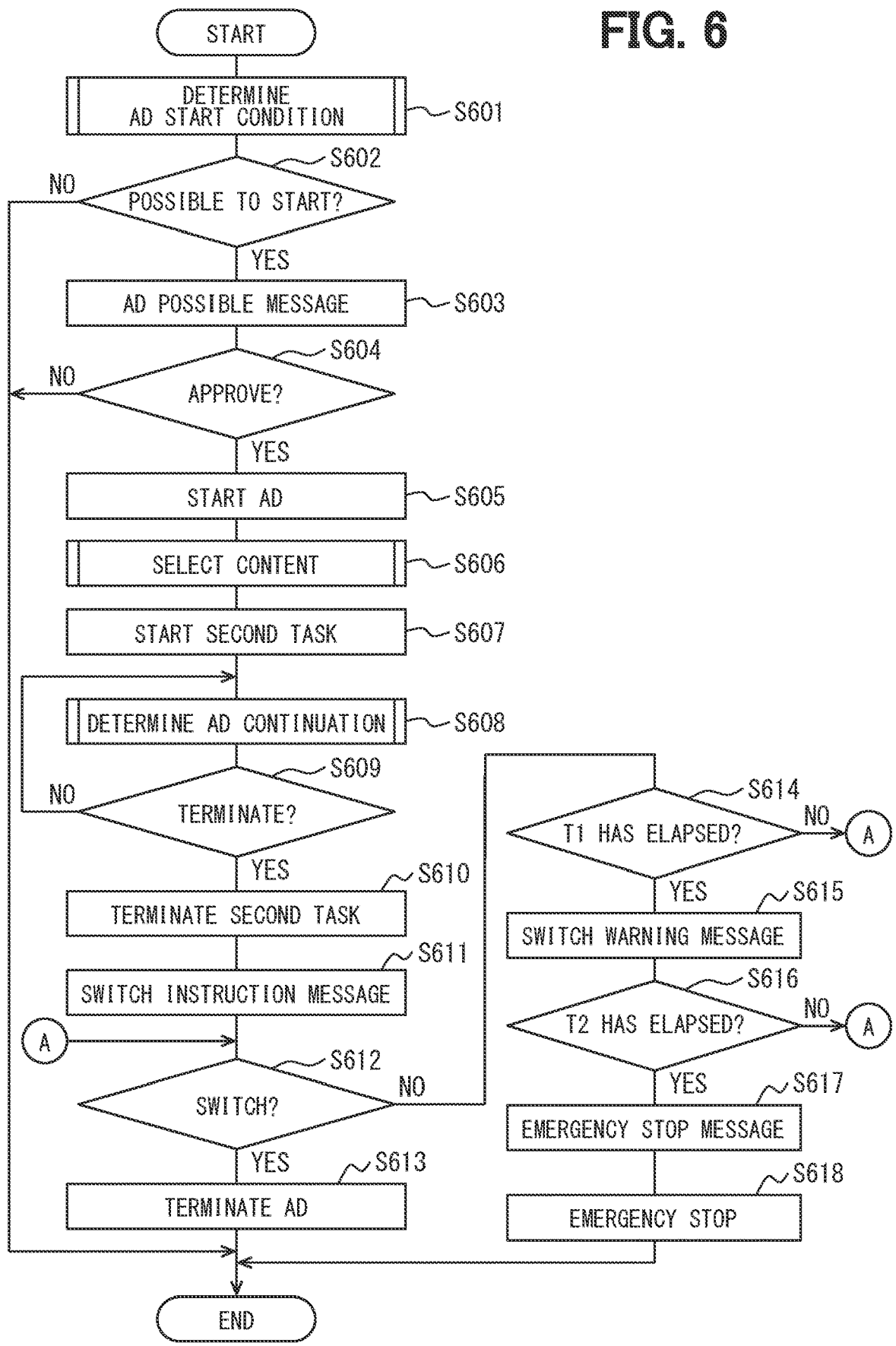
FIG. 6 is a flowchart illustrating an operation example of the in-vehicle system illustrated in FIG. 1.

FIG. 6 illustrates a flow of a series of operations of the in-vehicle system 10 concerning autonomous driving. A series of operations illustrated in FIG. 6 is hereinafter referred to as "autonomous driving control operation".

In S601, the in-vehicle system 10 determines whether or not the autonomous driving start condition is satisfied. The processing of S601 is performed by the driving control ECU 17 as corresponding to the operation of the driving level determination unit 172, for example. Details of the processing content of S601 will be described later. After the processing of S601, the in-vehicle system 10 advances the processing to S602.

In S602, the in-vehicle system 10 determines whether or not the autonomous driving can be started. That is, the in-vehicle system 10 determines whether the determination result in S601 is the satisfaction or non-satisfaction of the autonomous driving start condition.

When the autonomous driving can be started (i.e., S602: YES), the in-vehicle system 10 performs the processing of S603. In S603, the in-vehicle system 10 causes the HMI device 20 to output an autonomous driving possible message. The autonomous driving possible message is a message including the reason why the autonomous driving has become possible and the fact that the autonomous driving can be started. The autonomous driving possible message is displayed on the CID display 221 and is output by voice from a speaker (not illustrated). The in-vehicle system 10 causes the CID display 221 to display the Run button and the Not Run button described above.

On the other hand, when the autonomous driving cannot be started (i.e., S602: NO), the in-vehicle system 10 skips all the processing after S603 and terminates the autonomous driving control operation. The processing of S602 is performed by the HMI control device 23 as corresponding to the operations of the vehicle information acquisition unit 231 and the display control unit 236, for example. The processing of S603 is performed by the HMI control device 23 as corresponding to the operation of the display control unit 236, for example.

After the processing of S603, the in-vehicle system 10 advances the processing to S604. In S604, the in-vehicle system 10 determines whether or not the driver has approved the start of the autonomous driving by operating the Run button for approving the execution of the autonomous driving and starting the autonomous driving of the own vehicle. The processing of S604 is performed by the HMI control device 23 as corresponding to the operation of the HMI control device 23.

When the driver selects and operates the Run button to approve the start of the autonomous driving (i.e., S604: YES), the in-vehicle system 10 sequentially performs the processing of S605 to S607. On the other hand, when the driver does not approve the start of the autonomous driving (i.e., S604: NO), the in-vehicle system 10 skips all the processing after S605 and terminates the autonomous driving control operation. Since the determination result in S602 or S604 is "NO", even after the autonomous driving control operation is temporarily terminated, the processing from S601 can be restarted by the satisfaction of a predetermined restart condition. Such a restart condition is, for example, a predetermined autonomous driving start trigger operation (e.g., operation of a steering switch (not illustrated) included in the operation unit 19, etc.), the elapse of a predetermined interval time, detection of occurrence of traffic congestion in a place to which the own vehicle is going, or the like. Specifically, for example, there may be a case where the start of the autonomous driving is disapproved in S604 immediately after the own vehicle enters a specific section where the high-speed range autonomous driving is possible. In such a case, a considerable traveling distance or traveling time may be required until the own vehicle exits from such a specific section. Therefore, in such a case, when the driver changes his/her mind or is caught in traffic congestion after the disapproval operation and thus desires to execute the autonomous driving afterward, the autonomous driving becomes available sufficiently.

In S605, the in-vehicle system 10 starts autonomous driving. Specifically, for example, when the start condition for the high-speed range autonomous driving is satisfied in S601, the in-vehicle system 10 starts the execution of the high-speed range autonomous driving. On the other hand, when the start condition for the autonomous driving in traffic congestion is satisfied in S601, the in-vehicle system 10 starts the execution of the autonomous driving in traffic congestion. The processing of S605 is performed by the driving control ECU 17 as corresponding to the operation of the driving level determination unit 172, for example.

In S606, the in-vehicle system 10 performs a selection operation for second task content to be used during autonomous driving. The processing of S606 is performed by the HMI control device 23 as corresponding to the operation of the HMI control device 23. Details of the processing content of S606 will be described later.

In S607, the in-vehicle system 10 starts executing or using the second task content selected in S606. The processing of S607 is performed by the HMI control device 23 as corresponding to the operation of the HMI control device 23.

During autonomous driving, the in-vehicle system 10 repeatedly performs the processing of S608 and S609. In S608, the in-vehicle system 10 determines whether or not to continue the autonomous driving. The processing of S608 is performed by the driving control ECU 17 and the HMI control device 23. Details of the processing content of S608 will be described later.

In S609, the in-vehicle system 10 determines whether or not the determination result in S608 is the termination of the autonomous driving. When the autonomous driving is continued (i.e., S609: NO), the in-vehicle system 10 returns the processing to S608. When the second task content selected in S606 ends during autonomous driving, the processing returns to S606. On the other hand, when terminating the autonomous driving (i.e., S609: YES), the in-vehicle system 10 performs the processing of S610 and subsequent steps. The processing of S609 is performed by the driving control ECU 17 as corresponding to the operation of the driving level determination unit 172, for example.

In S610, the in-vehicle system 10 terminates the second task. In subsequent S611, the in-vehicle system 10 causes the meter display 212 and the CID display 221 to display a switch instruction message and causes a speaker (not illustrated) to output the switch instruction message by voice. The switch instruction message is a message for urging the driver to switch the driving. The "driving switch" means the passing of the driving operation from the system to the driver, that is, the switching of responsibility for executing the dynamic driving task from the system to the driver. The processing of S610 and S611 are performed by the HMI control device 23 as corresponding to the operation of the HMI control device 23.

Subsequent to the processing of S611, the in-vehicle system 10 performs the processing of S612. In S612, the in-vehicle system 10 determines whether or not driving switch preparation has been completed and the driving switch is possible. The driving switch preparation means that the driver sets the driving posture for the driving switch. Specifically, the in-vehicle system 10 determines whether or not the driving switch preparation has been completed on the basis of detection results of the state of the driver's holding a steering wheel and the direction of the driver's line of sight. The processing of S612 is performed by the driving control ECU 17 as corresponding to the operations of the information acquisition unit 171 and the driving level determination unit 172, for example.

When the driving switch preparation is completed and the driving switch is possible (i.e., S612: YES), the in-vehicle system 10 advances the processing to S613. In S613, the in-vehicle system 10 performs the driving switch. That is, the in-vehicle system 10 terminates the autonomous driving and sets the driving autonomy level to SAE Level 2. The processing of S613 is performed by the driving control ECU 17 as corresponding to the operation of the driving level determination unit 172, for example. Thereafter, the in-vehicle system 10 terminates the autonomous driving control operation.

When the driving switch preparation is not completed (i.e., S612: NO), the in-vehicle system 10 advances the processing to S614. In S614, the in-vehicle system 10 determines whether or not a predetermined time T1 has elapsed since the start of display of the switch instruction message in S611. When the predetermined time T1 has not elapsed (i.e., S614: NO), the in-vehicle system 10 returns the processing to S612. On the other hand, when the predetermined time T1 has elapsed (i.e., S614: YES), the in-vehicle system 10 advances the processing to S615 and S616. The processing of S614 is performed by the HMI control device 23 as corresponding to the operation of the HMI control device 23.

In S615, the in-vehicle system 10 causes the meter display 212 and the CID display 221 to display the switch warning message and causes the speaker to output the switch warning message by voice. The switch warning message is a message for warning that the driving switch is not possible because the driving switch preparation has not been completed. The processing of S615 is performed by the HMI control device 23 as corresponding to the operation of the display control unit 236, for example.

In S616, the in-vehicle system 10 determines whether or not a predetermined time T2 has elapsed since the start of display of the switch instruction message in S611. T2 is larger than T1. When the predetermined time T2 has not elapsed (i.e., S616: NO), the in-vehicle system 10 returns the processing to S612. On the other hand, when the predetermined time T2 has elapsed (i.e., S616: YES), the in-vehicle system 10 advances the processing to S617 and S618. The processing of S616 is performed by the HMI control device 23 as corresponding to the operation of the HMI control device 23.

In S617, the in-vehicle system 10 causes the meter display 212 and the CID display 221 to display an emergency stop message for emergency stop of the own vehicle and causes the speaker to output the emergency stop message by voice. The processing of S617 is performed by the HMI control device 23 as corresponding to the operation of the display control unit 236, for example.

In S618, the in-vehicle system 10 performs processing necessary for urgently stopping the own vehicle in a safe place. Specifically, the information acquisition unit 171 in the driving control ECU 17 receives, from the HMI control device 23, information indicating that the emergency stop message has been displayed. Thereby, the driving control ECU 17 detects that the driving switch preparation has not been completed before the predetermined time T2 elapses. Then, the driving control ECU 17 performs vehicle control necessary for urgently stopping the own vehicle at a safe place (e.g., emergency parking zone, etc.). Thereafter, the in-vehicle system 10 terminates the autonomous driving control operation.

(Determination of Autonomous Driving Start Condition)

Figure 7:
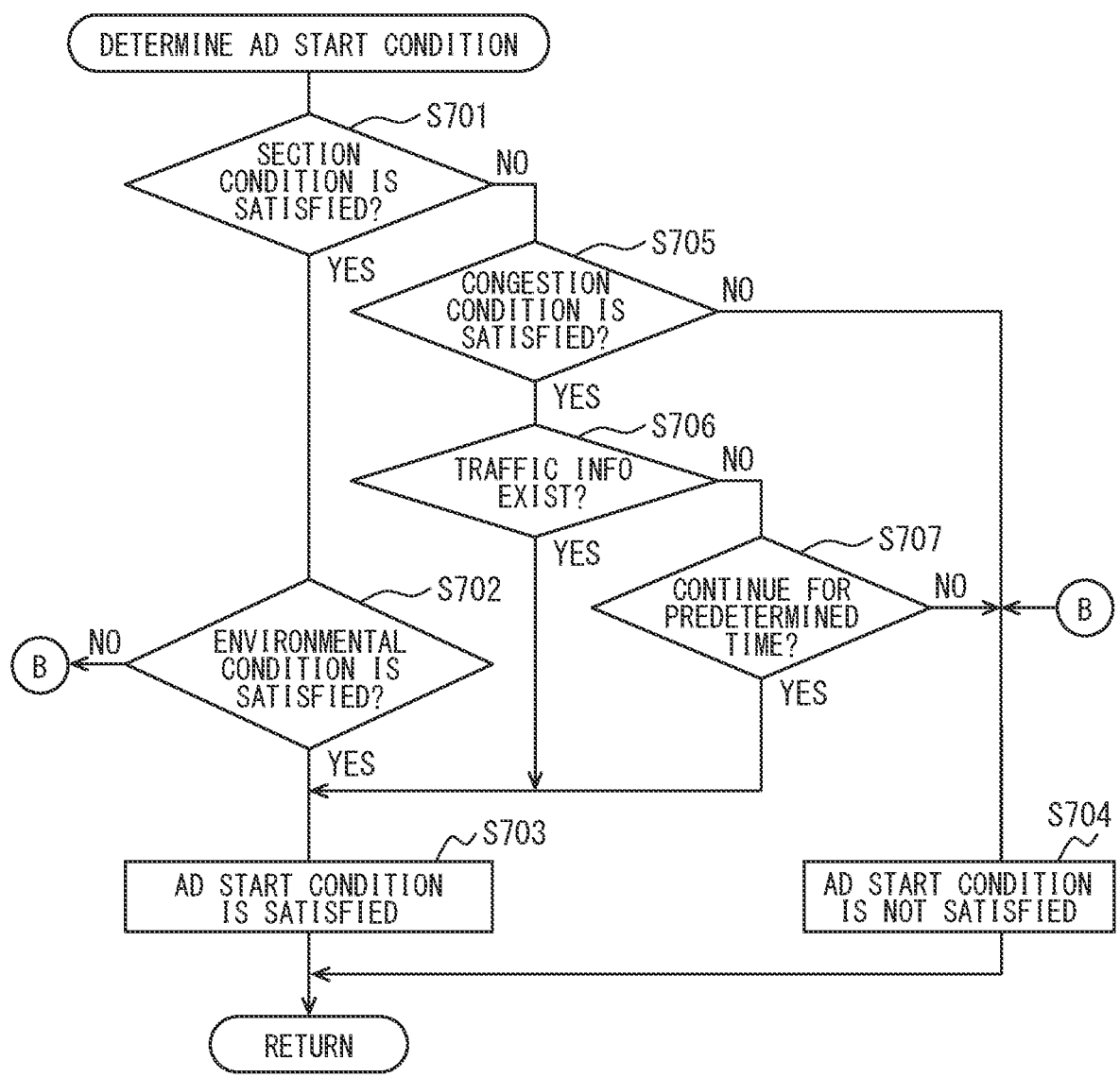
FIG. 7 is a flowchart illustrating an operation example of the driving control ECU illustrated in FIG. 1.

FIG. 7 illustrates details of the processing content of S601 illustrated in FIG. 6 for determining whether or not the autonomous driving start condition is satisfied. In the processing of determining the autonomous driving start condition, the driving control ECU 17 first performs the processing of S701.

In S701, the driving control ECU 17 determines whether or not the section condition is satisfied. The "section condition" means that the own vehicle is currently traveling in the specific section. When the section condition is satisfied (i.e., S701: YES), the driving control ECU 17 advances the processing to S702.

In S702, the driving control ECU 17 determines whether or not an environmental condition is satisfied. The "environmental condition" means a driving environment in which autonomous driving is possible. The environmental conditions include, for example, that autonomous driving is possible in a traffic environment, that there is no abnormality in each unit such as a sensor necessary for autonomous driving, and the like. Specifically, the traffic environment includes, for example, that there is no poor visibility due to fog or heavy rain, that there is no obstacle such as an accident or road construction in a scheduled autonomous driving section, and the like.

When the environmental condition is satisfied (i.e., S702: YES), the driving control ECU 17 performs the processing of S703 and then terminates the determination processing for the autonomous driving start condition. In S703, the driving control ECU 17 determines that the autonomous driving start condition is satisfied. Specifically, in this case, the driving control ECU 17 determines that the start condition for the high-speed range autonomous driving is satisfied.

On the other hand, when the environmental condition is not satisfied (i.e., S702: NO), the driving control ECU 17 performs the processing of S704 and then terminates the determination processing for the autonomous driving start condition. In S704, the driving control ECU 17 determines that the autonomous driving start condition is not satisfied.

When the section condition is not satisfied (i.e., S701: NO), the driving control ECU 17 advances the processing to S705. In S705, the driving control ECU 17 determines whether or not a congestion condition is satisfied. The "congestion condition" means that the own vehicle is currently traveling in a congestion section or that the own vehicle is about to enter the congestion section. Specifically, the congestion condition is satisfied when it is determined on the basis of the traffic information that the current position of the own vehicle is within or in the vicinity of the congestion section, and it is detected that one of (A) to (D) below applies. (A) The distance from a front vehicle is decreasing rapidly. (B) The speed of the front vehicle is decreasing rapidly. (C) The front vehicle is blinking the hazard lamp. (D) The distance from the front vehicle is a predetermined short distance (e.g., 10 m or less), and the traveling speed of the own vehicle is in a predetermined low-speed range (e.g., less than 20 km/h).

When the congestion condition is satisfied (i.e., S705: YES), the driving control ECU 17 advances the processing to S706. On the other hand, when the congestion condition is not satisfied (i.e., S705: NO), the driving control ECU 17 performs the processing of S704 and then terminates the determination processing for the autonomous driving start condition. In S704, the driving control ECU 17 determines that the autonomous driving start condition is not satisfied.

In S706, the driving control ECU 17 determines whether or not the latest traffic information has currently been acquired by the information acquisition unit 171. "Latest" means, for example, that the provision time of traffic information in the Japan Road Traffic Information Center or the like is within N minutes from the present time. N is, for example, 5 to 10.

When the latest traffic information has been acquired (i.e., S706: YES), the driving control ECU 17 performs the processing of S703 and then terminates the determination processing for the autonomous driving start condition. In S703, the driving control ECU 17 determines that the autonomous driving start condition is satisfied. Specifically, in this case, the driving control ECU 17 determines that the start condition for the autonomous driving in traffic congestion is satisfied.

On the other hand, when the latest traffic information has not been acquired (i.e., S706: NO), the driving control ECU 17 advances the processing to S707. In S707, the driving control ECU 17 determines whether or not a state where the congestion condition is satisfied continues for a predetermined time.

When the state where the congestion condition is satisfied continues for the predetermined time (i.e., S707: YES), the driving control ECU 17 performs the processing of S703 and then terminates the determination processing for the autonomous driving start condition. In S703, the driving control ECU 17 determines that the autonomous driving start condition is satisfied. Specifically, in this case, the driving control ECU 17 determines that the start condition for the autonomous driving in traffic congestion is satisfied.

On the other hand, when the state where the congestion condition is satisfied is not continued for the predetermined time (i.e., S707: NO), the driving control ECU 17 performs the processing of S704 and then terminates the determination processing for the autonomous driving start condition. In S704, the driving control ECU 17 determines that the autonomous driving start condition is not satisfied.

(Content Selection)

Figure 8:
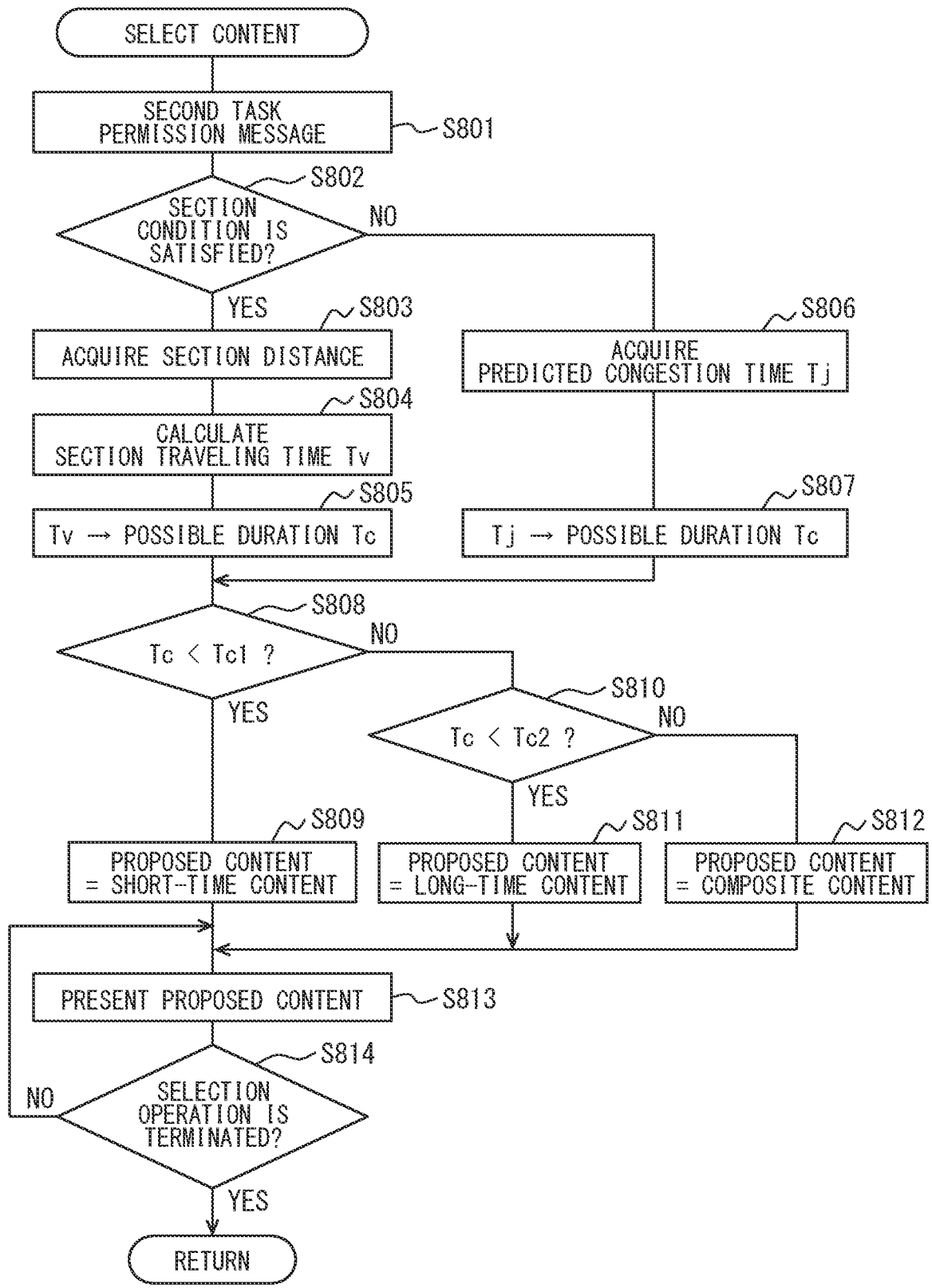
FIG. 8 is a flowchart illustrating an operation example of the HMI control device illustrated in FIG. 1.

FIG. 8 illustrates details of the processing content of S606 illustrated in FIG. 6, which selects second task content to be used during autonomous driving. In such content selection processing, the HMI control device 23 first performs the processing of S801 and S802.

In S801, the HMI control device 23 causes the CID display 221 to display a second task permission message. The second task permission message is a message for notifying the driver that the second task can be used. In S802, the HMI control device 23 determines whether or not the section condition is satisfied. That is, the HMI control device 23 determines whether or not the autonomous driving started to be executed this time is high-speed range autonomous driving.

When the autonomous driving started to be executed this time is the high-speed range autonomous driving (i.e., S802: YES), the HMI control device 23 performs the processing of S803, S804, and S805. On the other hand, when the autonomous driving started to be executed this time is the autonomous driving in traffic congestion (i.e., S802: NO), the HMI control device 23 performs the processing of S806 and S807.

S803 to S805 are processing for acquiring a possible duration Tc for the high-speed range autonomous driving that is the autonomous driving at SAE Level 3 at which traveling in the high-speed range is possible in the specific section. In S803, the HMI control device 23 acquires the remaining distance of the specific section in which the own vehicle is currently traveling. The remaining distance is a scheduled traveling distance from the current position of the own vehicle to a point where the own vehicle exits from the specific section (e.g., an exit interchange from which the own vehicle exits or the end point of the specific section).

In S804, the HMI control device 23 calculates a section traveling time Tv on the basis of the remaining distance acquired in S803. Specifically, the section traveling time Tv can be calculated, for example, by dividing the remaining distance acquired in S803 by the average traveling speed in the specific section in which the own vehicle is currently traveling.

In S805, the HMI control device 23 acquires the possible duration Tc on the basis of the section traveling time Tv calculated in S804. Specifically, the possible duration Tc can be calculated, for example, by multiplying or subtracting the section traveling time Tv calculated in S804 by using a predetermined correction constant.

There may be a case where the section traveling time Tv cannot be calculated in S804 for some reason. In this case, the HMI control device 23 sets the possible duration Tc to a settable maximum value. Specifically, for example, in a specification in which the value of the possible duration Tc is set using a 4-digit hexadecimal number from "0000" to "FFFF", the value of the possible duration Tc when the section traveling time Tv cannot be calculated is set to "FFFF".

S806 and S807 are processing for acquiring the possible duration Tc for the autonomous driving in traffic congestion, which is the autonomous driving at SAE Level 3 in which traveling in a medium-to-low-speed range is possible during traffic congestion. In S806, the HMI control device 23 acquires a predicted congestion time Tj that is the predicted duration of the traffic congestion. The predicted congestion time Tj is an estimated value of the time required for the own vehicle to finish traveling in the congestion section in which the own vehicle is currently traveling. Specifically, the predicted congestion time Tj can be calculated on the basis of, for example, the current average traveling speed of the own vehicle during traffic congestion and the congestion section remaining distance acquired from the congestion information.

In S807, the HMI control device 23 acquires the possible duration Tc on the basis of the predicted congestion time Tj acquired in S806. Specifically, the possible duration Tc can be calculated, for example, by multiplying or subtracting the predicted congestion time Tj acquired in S806 by using a predetermined correction constant. There may be a case where the predicted congestion time Tj cannot be acquired in S806 for some reason. In this case, the HMI control device 23 sets the possible duration Tc to a settable maximum value. A specific example in this case is, for example, "FFFF" as described above.

When the acquisition of the possible duration Tc corresponding to the start cause or the type of the autonomous driving is completed as described above, the HMI control device 23 advances the processing to S808. In S808, the HMI control device 23 determines whether or not the possible duration Tc is less than a first threshold Tc1.

When the possible duration Tc is less than the first threshold Tc1 (i.e., S808: YES), the HMI control device 23 advances the processing to S809. In S809, the HMI control device 23 determines the short-time content as proposed content. The proposed content is second task content proposed to be used by the driver.

When the possible duration Tc is equal to or more than the first threshold Tc1 (i.e., S808: NO), the HMI control device 23 advances the processing to S810. In S810, the HMI control device 23 determines whether or not the possible duration Tc is less than a second threshold Tc2. That is, the determination in S810 is a determination as to whether or not the possible duration Tc is equal to or more than the first threshold Tc1 and less than the second threshold Tc2. The second threshold Tc2 is a threshold for determining whether or not the possible duration Tc is set to the maximum value. First threshold Tc1<Second threshold Tc2. Therefore, the determination in S810 is a determination as to whether or not the time acquisition unit 233 has acquired the possible duration Tc.

When the possible duration Tc is less than the second threshold Tc2 (i.e., S810: YES), the HMI control device 23 advances the processing to S811. In S811, the HMI control device 23 determines the long-time content as the proposed content.

When the possible duration Tc is equal to or more than the second threshold Tc2 (i.e., S810: NO), it means that the time acquisition unit 233 has been unable to acquire the possible duration Tc. That is, the section traveling time Tv or the predicted congestion time Tj cannot be acquired for some reason, and the possible duration Tc has been set to the maximum value. Thus, in this case, the HMI control device 23 advances the processing to S812. In S812, the HMI control device 23 determines composite content as the proposed content. The composite content is a combination of both short-time content and long-time content.

After the type of the proposed content is decided as described above, the HMI control device 23 advances the processing to S813 and S814. In S813, the HMI control device 23 causes the CID display 221 to display a presentation screen for the determined proposed content.

Specifically, when the proposed content is the short-time content, the HMI control device 23 causes the CID display 221 to display a short-time content presentation screen. The short-time content presentation screen is a display screen for presenting short-time content and is a screen on which "recommended" short-time content is displayed in the central display area DA1 in FIG. 2 so as to be executable or reproducible.

When the proposed content is content for long-time content, the HMI control device 23 causes the CID display 221 to display a long-time content presentation screen. The long-time content presentation screen is a display screen for presenting long-time content and is a screen on which "recommended" long-time content is displayed in the central display area DA1 in FIG. 2 so as to be executable or reproducible.

When the proposed content is the composite content, the HMI control device 23 selectably presents short-time content and long-time content that are a plurality of pieces of second task content each having different required execution duration. Specifically, the HMI control device 23 causes the CID display 221 to display the menu screen illustrated in FIG. 5.

In S814, the HMI control device 23 determines whether or not the content selection operation by the driver or the like is terminated. While the content selection operation has not been completed, the determination in S814 is "NO", and the HMI control device 23 returns the processing to S813. That is, the HMI control device 23 waits for the termination of the content selection operation. When the content selection operation is terminated (i.e., S814: YES), the HMI control device 23 terminates the content selection processing. As a result, the use of the selected second task content starts.

(Autonomous Driving Continuation Determination)

Figure 9:
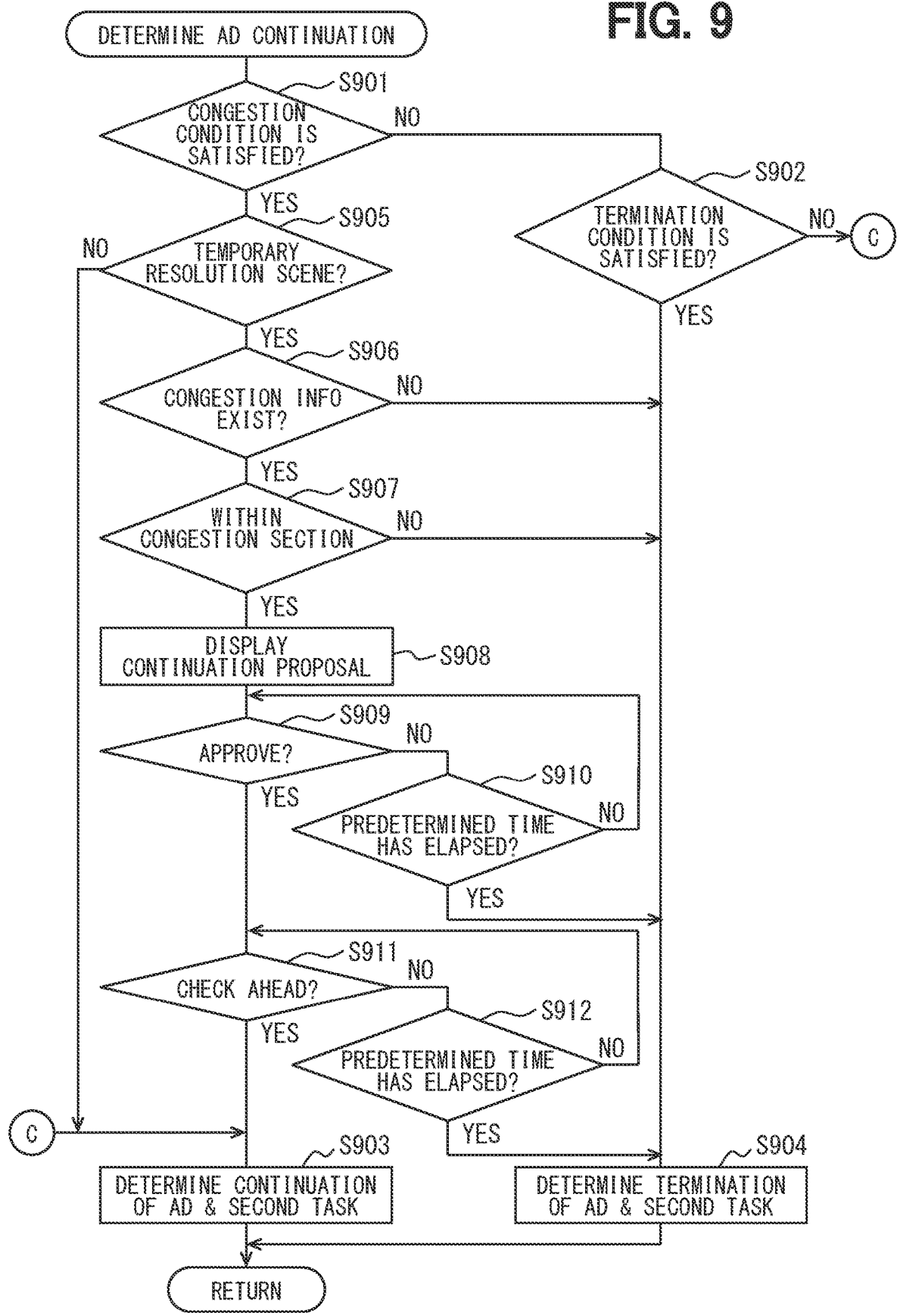
FIG. 9 is a flowchart illustrating an operation example of the driving control ECU illustrated in FIG. 1.

FIG. 9 illustrates details of the processing content of S608 illustrated in FIG. 6 for determining whether or not to continue the autonomous driving. In the continuation determination processing for the autonomous driving, the driving control ECU 17 first performs the processing of S901.

In S901, the driving control ECU 17 determines whether or not it is determined in S705 that the congestion condition is satisfied. That is, the driving control ECU 17 determines whether the currently executed autonomous driving at SAE Level 3 is the autonomous driving in traffic congestion or the high-speed range autonomous driving.

When the currently executed autonomous driving is the high-speed range autonomous driving (i.e., S901: NO), the driving control ECU 17 advances the processing to S902. In S902, the driving control ECU 17 determines whether or not the termination condition for the high-speed range autonomous driving is satisfied. The termination condition includes, for example, that a distance or a required time to a point where the own vehicle exits from the specific section (e.g., an exit interchange from which the own vehicle exits or the end point of the specific section) is less than a predetermined value. The termination condition includes, for example, that the behavior of the own vehicle up to a predetermined time (e.g., 15 seconds) ahead becomes unpredictable when the traffic environment or the road condition ahead of the own vehicle is considered.

When the termination condition is not satisfied (i.e., S902: NO), the driving control ECU 17 advances the processing to S903 and then temporarily terminates the continuation determination processing for the autonomous driving. In S903, the driving control ECU 17 determines the continuation of the autonomous driving and the second task.

When the termination condition is satisfied (i.e., S902: YES), the driving control ECU 17 advances the processing to S904 and then terminates the continuation determination processing for the autonomous driving. In S904, the driving control ECU 17 determines the termination of the autonomous driving and the second task.

When the currently executed autonomous driving is the autonomous driving in traffic congestion (i.e., S901: YES), the driving control ECU 17 advances the processing to S905. In S905, the driving control ECU 17 determines whether or not a scene where the traffic congestion is temporarily resolved has occurred. That is, the driving control ECU 17 determines whether or not the temporary resolution of the traffic congestion has been detected.

When the scene where the traffic congestion is temporarily resolved does not occur (i.e., S905: NO), the driving control ECU 17 advances the processing to S903 and then temporarily terminates the continuation determination processing for the autonomous driving. In S903, the driving control ECU 17 determines the continuation of the autonomous driving and the second task.

When the scene where the traffic congestion is temporarily resolved occurs (i.e., S905: YES), the driving control ECU 17 advances the processing to S906. In S906, the driving control ECU 17 determines whether or not the latest congestion information has currently been acquired by the information acquisition unit 171.

When the latest congestion information has not been currently acquired (i.e., S906: NO), the driving control ECU 17 advances the processing to S904 and then terminates the continuation determination processing for the autonomous driving. In S904, the driving control ECU 17 determines the termination of the autonomous driving and the second task.

When the latest congestion information is currently acquired (i.e., S906: YES), the driving control ECU 17 advances the processing to S907. In S907, the driving control ECU 17 determines whether or not the current traveling position of the own vehicle is within the congestion section.

When the current traveling position of the own vehicle is not within the congestion section (i.e., S907: NO), the driving control ECU 17 advances the processing to S904 and then terminates the continuation determination processing for the autonomous driving. In S904, the driving control ECU 17 determines the termination of the autonomous driving and the second task.

When the current traveling position of the own vehicle is within the congestion section (i.e., S907: YES), the driving control ECU 17 advances the processing to S908 and S909.

In S908, the driving control ECU 17 transmits a command for causing the CID display 221 to perform the continuation proposal display to the HMI control device 23. As a result, the HMI control device 23 causes the CID display 221 to perform a continuation proposal display. The continuation proposal display includes a continuation proposal message that proposes the continuation of the autonomous driving and an approval button DA6 for continuation approval illustrated in FIG. 3. For example, the continuation proposal message is alternately displayed with an attention-ahead message that is a notation of "ATTENTION AHEAD" in the message display box DB4 illustrated in FIG. 3. The HMI control device 23 performs voice guidance corresponding to the continuation proposal display content by using a speaker (not illustrated).

In S909, the driving control ECU 17 determines whether or not an approval operation has been performed by the driver or the like in the HMI device 20. That is, the driving control ECU 17 receives, from the HMI control device 23, a determination result as to whether or not the selection operation has been performed on the approval button DA6 illustrated in FIG. 3.

When the approval operation has not been performed (i.e., S909: NO), the driving control ECU 17 advances the processing to S910. In S910, the driving control ECU 17 determines whether or not a predetermined time has elapsed since the start of the continuation proposal display. When the predetermined time has not been elapsed, the determination in S910 is "NO", and the driving control ECU 17 returns the processing to S909. That is, the driving control ECU 17 waits for the approval operation for the predetermined time.

When the predetermined time has elapsed without the execution of the approval operation, the determination in S910 is "YES". In this case, the driving control ECU 17 advances the processing to S904 and then terminates the continuation determination processing for the autonomous driving. In S904, the driving control ECU 17 determines the termination of the autonomous driving and the second task.

When the approval operation is performed within the predetermined time, the determination in S909 is "YES". In this case, the driving control ECU 17 advances the processing to S911. In S911, the driving control ECU 17 determines whether or not the driver is checking a road condition ahead, that is, in a place to which the vehicle is going.

When the driver is checking ahead (i.e., S911: YES), the driving control ECU 17 advances the processing to S903 and then temporarily terminates the continuation determination processing for the autonomous driving. In S903, the driving control ECU 17 determines the continuation of the autonomous driving and the second task.

When the driver is not checking ahead (i.e., S911: NO), the driving control ECU 17 advances the processing to S912. In S912, the driving control ECU 17 determines whether or not a predetermined time has elapsed since the approval operation. When the predetermined time has not been elapsed, the determination in S912 is "NO", and the driving control ECU 17 returns the processing to S911. That is, the driving control ECU 17 waits for the driver to check ahead for a predetermined time.

When a predetermined time has elapsed since the approval operation without the driver checking ahead, the determination in S912 is "YES". In this case, the driving control ECU 17 advances the processing to S904 and then terminates the continuation determination processing for the autonomous driving. In S904, the driving control ECU 17 determines the termination of the autonomous driving and the second task.

Second Embodiment

Figure 10:
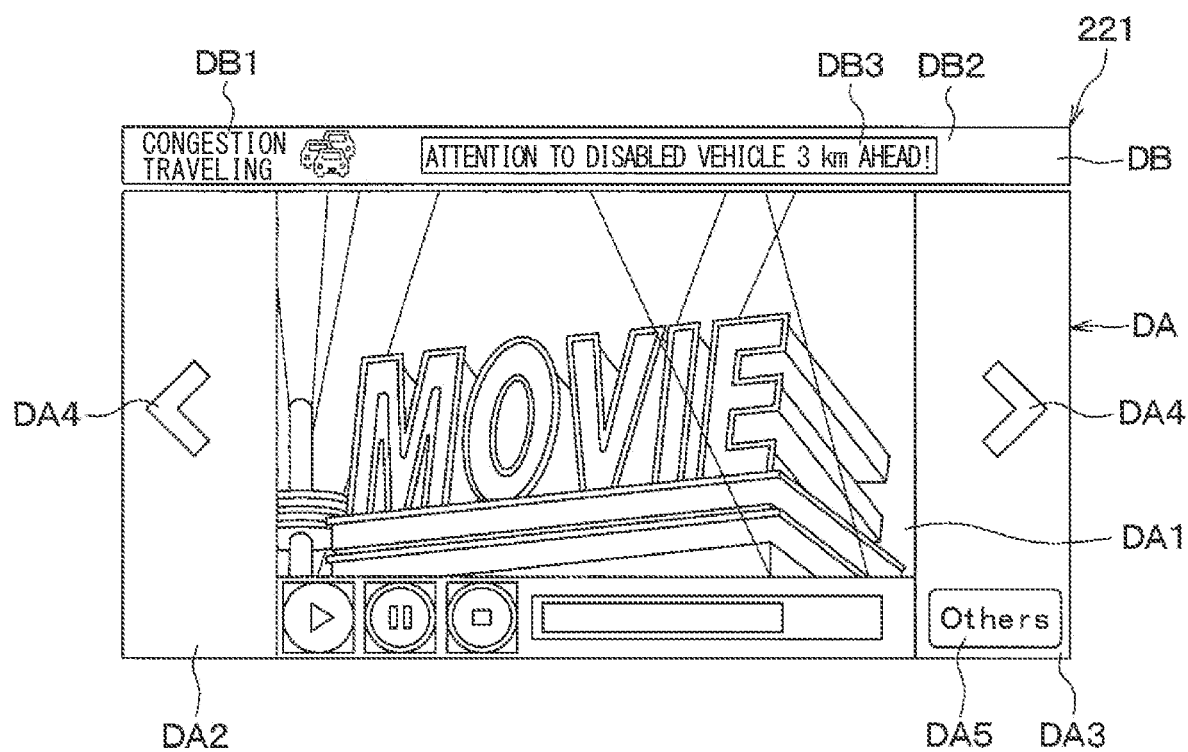
FIG. 10 is a schematic diagram illustrating still another example of the display mode in the HMI device illustrated in FIG. 1.

Hereinafter, a second embodiment will be described with reference to FIGS. 10 and 11 in addition to FIGS. 1 to 9. In the following description of the second embodiment, portions different from those of the first embodiment will be mainly described. In the first embodiment and the second embodiment, the same or equivalent portions are denoted by the same reference numerals. Therefore, in the following description of the second embodiment, with respect to constituent elements having the same reference numerals as those in the first embodiment, the description in the first embodiment can be appropriately incorporated unless there is a technical contradiction or a special additional description. The same applies to third and subsequent embodiments to be described later.

The basic configuration of the in-vehicle system 10 according to the present embodiment is similar to that of FIG. 1. The basic operation of the in-vehicle system 10 according to the present embodiment is similar to that in FIGS. 2 to 9. In the present embodiment, in addition to the first embodiment, the following functions are added.

For example, since there is a traffic hazard event such as an accident, traffic congestion, a broken car, or construction in a place to which the own vehicle is going, the driver may look away from the CID display 221 and check ahead many times even during the second task. Therefore, in the present embodiment, the display control unit 236 causes the HMI device 20 to display the road condition when the behavior acquisition unit 232 acquires the detection result indicating that the driver is checking a road condition in a place to which the own vehicle is going. Specifically, when the driver checks ahead at a predetermined frequency, the display control unit 236 causes the information display box DB3 to display the road condition as illustrated in FIG. 10.

Figure 11:
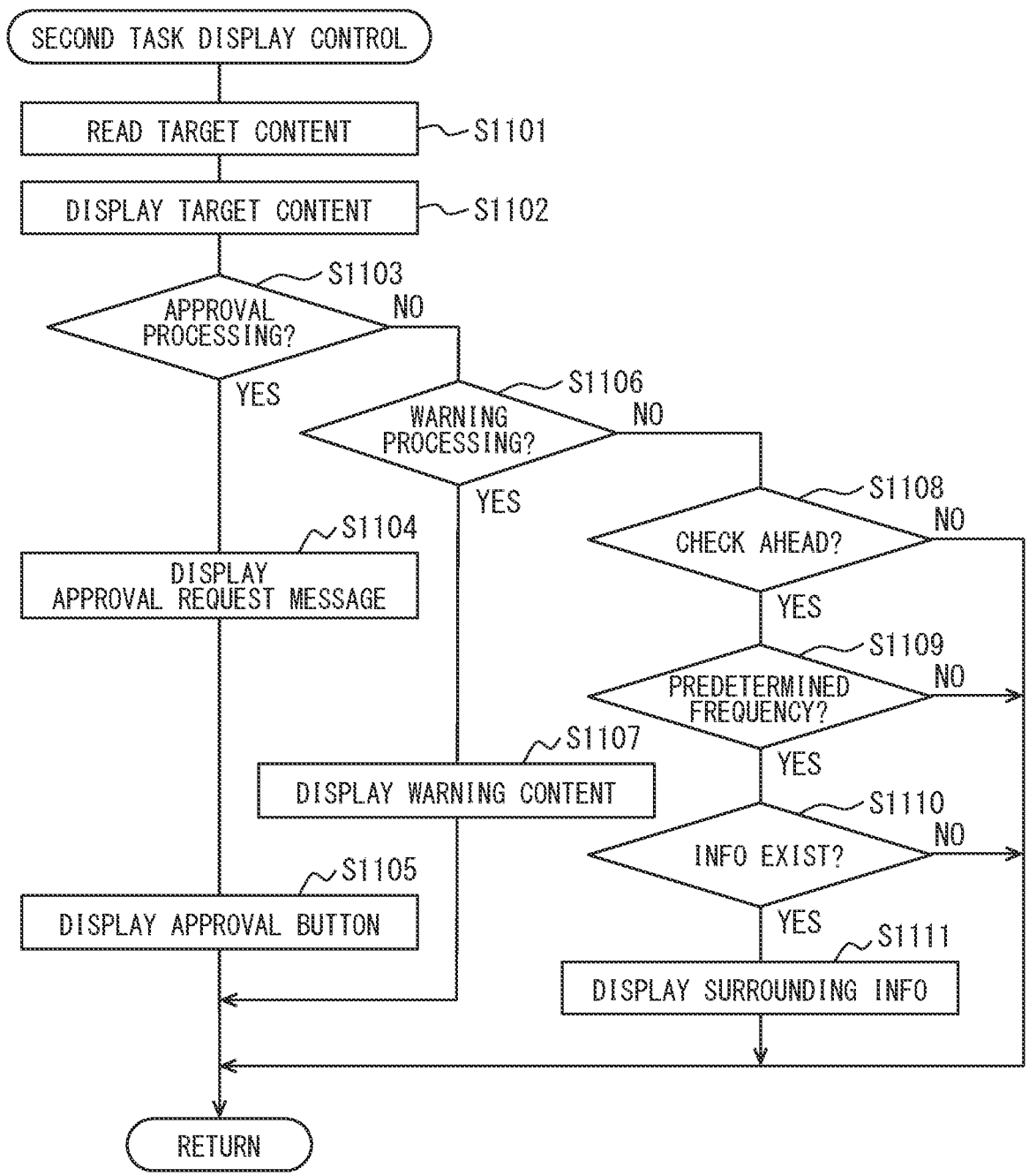
FIG. 11 is a flowchart illustrating another operation example of the HMI control device illustrated in FIG. 1.

FIG. 11 illustrates a second task display control processing performed by the HMI control device 23. The display control processing of the second task is repeatedly performed at predetermined time intervals (e.g., 100 msec) from a time point at which the processing proceeds to S607 to a time point at which the processing proceeds to S610 in the flowchart illustrated in FIG. 6.

In the display control processing of the second task, first, in S1101, the HMI control device 23 reads the data of the display content into a temporary storage area such as a RAM. The display content is second task content to be displayed on the CID display 221. Next, in S1102, the HMI control device 23 causes the CID display 221 to display the display content by using the data read in S1101.

Subsequently, in S1103, the HMI control device 23 determines whether or not to perform the present approval processing. The approval processing is processing for receiving various approval operations by the driver.

In a case where the approval processing is performed (i.e., S1103: YES), the HMI control device 23 temporarily terminates the display control processing of the second task after performing the processing of S1104 and S1105. In S1104, the HMI control device 23 causes the CID display 221 to display the approval request message. In S1105, the HMI control device 23 causes the CID display 221 to display an approval button DA6.

In a case where the approval processing is not performed (i.e., S1103: NO), the HMI control device 23 advances the processing to S1106. In S1106, the HMI control device 23 determines whether or not the warning processing is performed this time. The warning processing is processing for issuing various warnings to the driver.

In a case where the warning processing is performed (i.e., S1106: YES), the HMI control device 23 temporarily terminates the display control processing of the second task after performing the processing of S1107. In S1107, the HMI control device 23 causes the CID display 221 to display warning content. The warning content includes messages and/or graphics for various warnings.

In a case where the warning processing is not performed (i.e., S1106: NO), the HMI control device 23 advances the processing to S1108. In S1108, the HMI control device 23 determines whether or not the driver is checking ahead.

When the driver is not checking ahead (i.e., S1108: NO), the HMI control device 23 temporarily terminates the display control processing of the second task. On the other hand, when the driver is checking ahead (i.e., S1108: YES), the HMI control device 23 advances the processing to S1109.

In S1109, the HMI control device 23 determines whether or not the driver's checking ahead has reached a predetermined frequency. The "predetermined frequency" is the number of times per predetermined reference time, and is, for example, three or more times per five seconds. When the driver's checking ahead has not reached the predetermined frequency (i.e., S1109: NO), the HMI control device 23 temporarily terminates the second task display control processing. On the other hand, when the driver's checking ahead has reached the predetermined frequency (i.e., S1109: YES), the HMI control device 23 advances the processing to S1110.

In S1110, the HMI control device 23 determines whether or not the traffic information concerning the surroundings of the own vehicle has been acquired by the vehicle information acquisition unit 231. "Around the own vehicle" is a place to which the own vehicle is going and is within a range of a predetermined scheduled traveling distance (e.g., 5 km) from the current position of the own vehicle.

When the traffic information around the own vehicle has not been acquired (i.e., S1110: NO), the HMI control device 23 temporarily terminates the second task display control processing. On the other hand, when the traffic information around the own vehicle has been acquired (i.e., S1110: YES), the HMI control device 23 performs the processing of S1111 and then temporarily terminates the display control processing of the second task. In S1111, the HMI control device 23 causes the information display box DB3 to display the acquired traffic information concerning the surroundings of the own vehicle.

As described above, in the present embodiment, when the driver checks ahead at a predetermined frequency a plurality of times during the second task, traffic information concerning the surroundings of the own vehicle is displayed on the HMI device 20. Therefore, according to the present embodiment, the HMI device 20 can perform appropriate traffic information display in accordance with the actual traffic status.

First Additional Embodiment: Third Embodiment

Hereinafter, a third embodiment will be described. Also, in the description of the present embodiment, similarly to the description of the second embodiment, portions specific to the present embodiment will be mainly described while appropriately referring to the description in the preceding embodiment.

The present embodiment relates to processing when the possible duration Tc for the autonomous driving acquired by the time acquisition unit 233 is an ultrashort time. The "ultrashort time" is, for example, a time corresponding to less than several 10 seconds or less than a traveling distance of 1000 m. In the present embodiment, when the possible duration Tc is an ultrashort time, the driving control ECU 17 enables the execution of the autonomous driving in traffic congestion by the selection of the driver, while disabling the execution of the high-speed range autonomous driving.

Specifically, the operation of the present embodiment will be described with reference to FIG. 7. In the present embodiment, the "environmental condition" at the time of determining whether or not the environmental condition is satisfied in S702, which is executed when the section condition is satisfied (i.e., S701: YES), includes that the possible duration Tc is equal to or longer than a predetermined execution lower limit time. Here, the "execution lower limit time" is a determination reference value for determining whether the possible duration Tc corresponds to the ultrashort time described above and is a value sufficiently smaller than the first threshold Tc1 in S808 (e.g., 30 seconds).

When the possible duration Tc is shorter than the execution lower limit time, since the possible duration Tc corresponds to the ultrashort time described above, the determination result in S702 is "NO", and the driving control ECU 17 determines in S704 that the autonomous driving start condition is not satisfied. In this case, the determination result of S602 in the flowchart illustrated in FIG. 6 is "NO", and the in-vehicle system 10 skips all the processing after S603 and terminates the autonomous driving control operation. At this time, the HMI control device 23 may present by the HMI device 20 that the autonomous driving and the execution of the second task are not permitted because the possible duration Tc is shorter than the execution lower limit time.

On the other hand, when the section condition is not satisfied but the congestion condition is satisfied (i.e., S705: YES), the processing does not proceed to the satisfaction determination of the "environmental condition" including that the possible duration Tc is equal to or longer than the execution lower limit time (i.e., S702). That is, the execution condition for the autonomous driving in traffic congestion does not include that the possible duration Tc is equal to or longer than the predetermined execution lower limit time. As a result, the HMI control device 23 can execute the second task during the autonomous driving in traffic congestion for an ultrashort time. At this time, in S603, the HMI control device 23 may present by the HMI device 20 that the time required for executing the autonomous driving and using the second task associated with the execution is an ultrashort time.

As described above, according to the present embodiment, the execution of the ultrashort-time autonomous driving and the use of the second task associated with the execution are possible at the time of traffic congestion but are prohibited under the traveling conditions corresponding to the high-speed range autonomous driving. Therefore, according to the present embodiment, the execution of the autonomous driving and the use of the second task can be executed more appropriately.

When the possible duration Tc for the autonomous driving is short, the separation of the driver's consciousness from the driving of the own vehicle (i.e., the traveling state and the driving operation) due to the second task is prevented as much as possible, so that the driving switch can be smoothly performed at the termination of the autonomous driving. Thus, in such a case, the HMI device 20 that executes the second task may be limited to the in-vehicle device, that is, the CID device 22.

Figure 12:
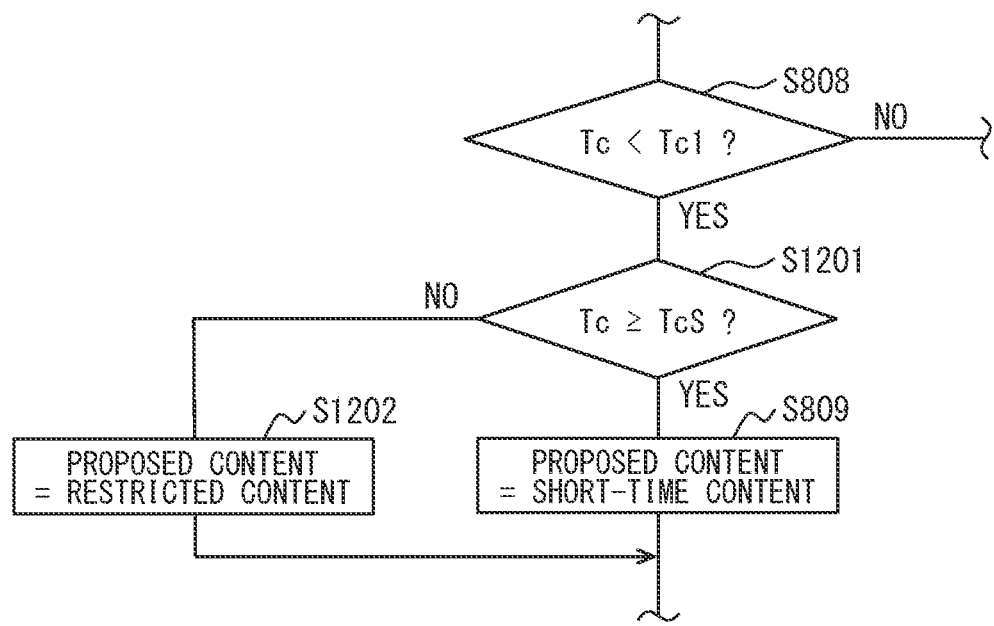
FIG. 12 is a flowchart illustrating still another operation example of the HMI control device illustrated in FIG. 1.

FIG. 12 illustrates an extracted modified portion when a part of the flowchart of FIG. 8 is modified corresponding to such an example. Specifically, referring to FIG. 12, when the possible duration Tc is less than the first threshold Tc1 (i.e., S808: YES), the HMI control device 23 advances the processing to S1201. In S1201, the HMI control device 23 determines whether or not the possible duration Tc is equal to or more than the model-limiting threshold TcS. Model-limiting threshold TcS<First threshold Tc1. That is, the model-limiting threshold TcS is a value sufficiently smaller than the first threshold Tc1 in S808.

When the possible duration Tc is equal to or more than a model-limiting threshold TcS (i.e., S1201: YES), the HMI control device 23 advances the processing to S809 and determines the short-time content as the proposed content. In contrast, when the possible duration Tc is less than the model-limiting threshold TcS (i.e., S1201: NO), the HMI control device 23 advances the processing to S1202. In S1202, the HMI control device 23 determines restricted content as the proposed content. Among pieces of short-time content, the restricted content is content that is limited to execution by the CID device 22, which is an in-vehicle device, is familiar to the use in an ultrashort time, and is easy for the driver to turn his/her consciousness to driving of the own vehicle. Specifically, the restricted content is, for example, a music video having a relatively short required execution duration and not causing a problem when only audio is listened to, a television broadcast having an inconceivable required execution duration, or the like.

The example illustrated in FIG. 12 is particularly effective when the possible duration Tc for the autonomous driving is an ultrashort time. That is, the second task presentation unit 234 may limit the HMI device 20 that executes the second task during congestion traveling to the in-vehicle device, that is, the CID device 22, when the possible duration Tc acquired on the basis of the predicted congestion time Tj is shorter than a predetermined model-limiting duration. The "predetermined model-limiting duration" is the model-limiting threshold TcS. In this case, the model-limiting threshold TcS may be equal to the above execution lower limit time, or a slight difference may be provided between the model-limiting threshold TcS and the execution lower limit time.

Second Additional Embodiment: Fourth Embodiment

Hereinafter, a fourth embodiment will be described. The present embodiment is slightly modified from the first embodiment and/or the third embodiment. Specifically, the present embodiment presents the second task permission message earlier when the autonomous driving in traffic congestion is executed in an ultrashort time.

That is, in the present embodiment, when the possible duration Tc for the autonomous driving is shorter than the predetermined time limit, the second task presentation unit 234 operates as follows. The second task presentation unit 234 presents, by the HMI device 20, information indicating that the second task is executable instead of or prior to the presentation of the executable second task based on the possible duration Tc.

Figure 13:
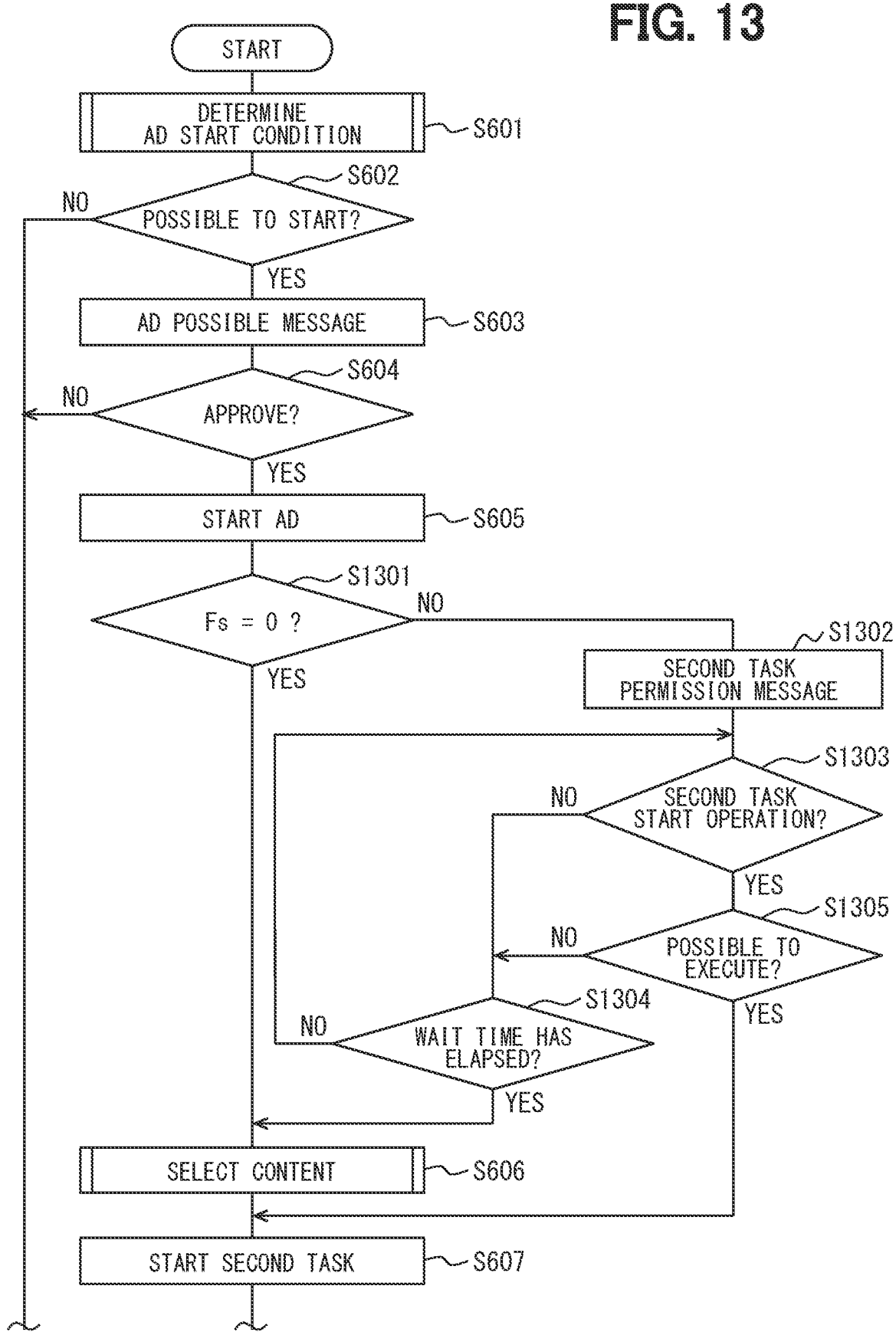
FIG. 13 is a flowchart illustrating another operation example of the in-vehicle system illustrated in FIG. 1.
Figure 14:
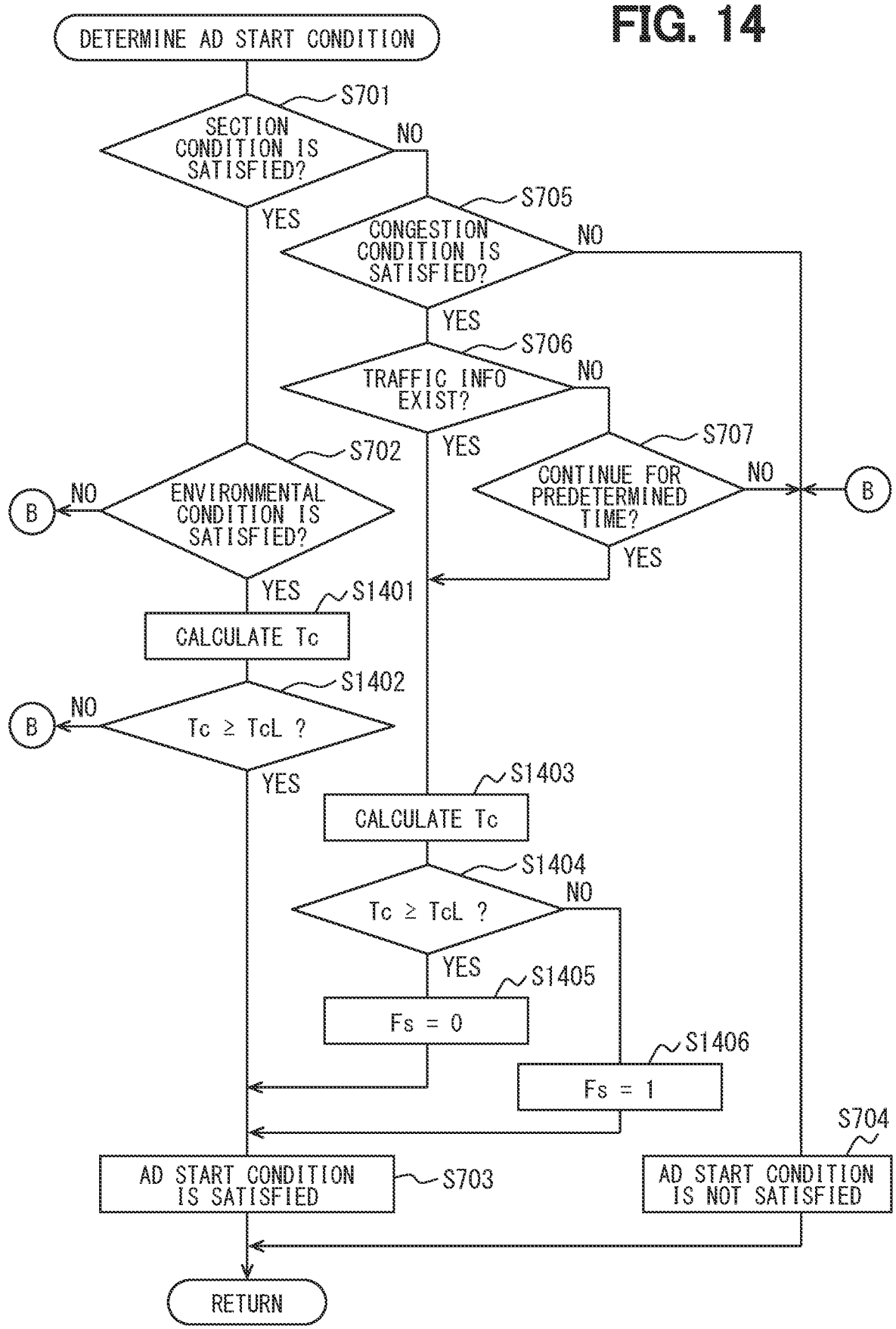
FIG. 14 is a flowchart illustrating another operation example of the driving control ECU illustrated in FIG. 1.

FIGS. 13 and 14 illustrate an operation example corresponding to the present embodiment. FIG. 13 illustrates the extracted periphery of the modified part when a part of the flowchart of FIG. 6 is modified corresponding to the present operation example. FIG. 14 is one obtained by modifying a part of the flowchart of FIG. 7 corresponding to this operation example.

Specifically, referring to FIG. 13, in S601, the in-vehicle system 10 determines whether or not the autonomous driving start condition is satisfied. At this time, as will be described later, setting processing for an ultrashort time flag Fs indicating whether or not the execution duration for the autonomous driving is an ultrashort time is executed. The processing content of each of S602 to S605 is similar to that of the first embodiment.

Following the processing of S605, the in-vehicle system 10 advances the processing to S1301. In S1301, the in-vehicle system 10 determines the setting state of the ultrashort time flag Fs. Specifically, the in-vehicle system 10 sets the determination result of S1301 to "YES" when the ultrashort time flag Fs has been reset (i.e., Fs=0), and sets the determination result of S1301 to "NO" when the ultrashort time flag Fs is set (i.e., Fs=1).

When the ultrashort time flag Fs has not been set (i.e., S1301: YES), the execution duration for the autonomous driving started in S605 this time is not an ultrashort time. Thus, in this case, the in-vehicle system 10 advances the processing to S606. In S606, the in-vehicle system 10 performs a selection operation for second task content to be used during autonomous driving. In the present embodiment, FIG. 8 itself or FIG. 8 modified by FIG. 12 can be applied as the content selection processing of S606.

When the ultrashort time flag Fs has been set (i.e., S1301: NO), the execution duration for the autonomous driving started in S605 this time is an ultrashort time. Thus, in this case, the in-vehicle system 10 advances the processing to sS1302 and S1303.

In S1302, the in-vehicle system 10 causes the CID display 221 to display the second task permission message. The processing content in S1302 is similar to S801 in the flowchart illustrated in FIG. 8.

By presenting the second task permission message in S1302, the driver can grasp that the second task can be started. Hence the driver or the like can arbitrarily operate the HMI device 20 by himself/herself to select and execute, that is, start, the desired second task content. In S1303, the in-vehicle system 10 determines whether or not a second task start operation has been performed by the driver or the like.

When the second task start operation has not been performed yet (i.e., S1303: NO), the in-vehicle system 10 waits for such an operation for a predetermined time. Specifically, when the determination result in S1303 is "NO", the in-vehicle system 10 advances the processing to S1304. In S1304, the in-vehicle system 10 determines whether or not a predetermined wait time has elapsed since the presentation timing of the second task permission message in S1302. Before the wait time elapses (i.e., S1304: NO), the in-vehicle system 10 returns the processing to S1303. On the other hand, after the wait time has elapsed (i.e., S1304: YES), the in-vehicle system 10 advances the processing to S606. Thereby, normal content selection processing is performed.

When the second task start operation is performed before the wait time elapses (i.e., S1303: YES), the in-vehicle system 10 advances the processing to S1305. In S1305, the in-vehicle system 10 determines whether or not the second task instructed to be executed by the second task start operation is executable. Specifically, for example, the in-vehicle system 10 determines whether or not the second task instructed to be executed by the second task start operation is the restricted content described above that can be executed during the ultrashort-time autonomous driving.

When the second task instructed to be executed by the second task start operation is executable (i.e., S1305: YES), the in-vehicle system 10 advances the processing to S607. In S607, the in-vehicle system 10 starts the execution, that is, the use of the second task content selected by the second task start operation. That is, in this case, the content selection processing of S606 is skipped. On the other hand, when the second task instructed to be executed by the second task start operation is not executable (i.e., S1305: NO), the in-vehicle system 10 advances the processing to S1304.

Referring to FIG. 14, the processing content of S701 is similar to that of the first embodiment. When the processing proceeds to S702, the own vehicle is currently traveling in the specific section where the high-speed range autonomous driving is executable.

When it is determined in S702 that the environmental condition is not satisfied (i.e., S702: NO), the driving control ECU 17 performs the processing of S704 and then terminates the determination processing for the autonomous driving start condition. In S704, the driving control ECU 17 determines that the autonomous driving start condition is not satisfied. On the other hand, when it is determined in S702 that the environmental condition is satisfied (i.e., S702: YES), the driving control ECU 17 advances the processing to S1401 and S1402.

The "environmental condition" in this case does not include that there is no obstacle such as an accident or road construction in the scheduled autonomous driving section or that the possible duration Tc is equal to or longer than the predetermined execution lower limit time for the following reasons. Whether or not there is an obstacle such as an accident or road construction in the scheduled autonomous driving section is reflected in the length of the possible duration Tc. Whether or not the possible duration Tc is equal to or longer than the execution lower limit time is processed as whether or not the ultrashort time flag Fs is set, instead of whether or not the environmental condition in S702 is satisfied, in the present embodiment.

In S1401, the driving control ECU 17 acquires, that is, calculates, the possible duration Tc for the high-speed range autonomous driving. The processing content of S1401 is similar to S803 to S805 in the flowchart illustrated in FIG. 8.

In S1402, the driving control ECU 17 determines whether or not the calculated possible duration Tc is equal to or longer than a time limit TcL. The time limit TcL may be equal to the model-limiting threshold TcS or the execution lower limit time described above, or a slight difference may be provided therebetween. Time limit TcL<First threshold Tc1. That is, the time limit TcL is a value sufficiently smaller than the first threshold Tc1 in S808.

When the possible duration Tc for the high-speed range autonomous driving is shorter than the time limit TcL (i.e., S1402: NO), the driving control ECU 17 performs the processing of S704 and then terminates the determination processing for the autonomous driving start condition. In S704, the driving control ECU 17 determines that the autonomous driving start condition is not satisfied. That is, when the possible duration Tc for the high-speed range autonomous driving is shorter than the time limit TcL, the high-speed range autonomous driving is not executed, and thus the execution of the second task is not permitted, either.

In contrast, when the possible duration Tc for the high-speed range autonomous driving is equal to or longer than the time limit TcL (i.e., S1402: YES), the driving control ECU 17 performs the processing of S703 and then terminates the determination processing for the autonomous driving start condition. In S703, the driving control ECU 17 determines whether the start condition for the high-speed range autonomous driving is satisfied.

The processing content of S705 in FIG. 14 is similar to that of the first embodiment. The determination contents in S706 and S707 are the same as those in the first embodiment. When the start condition for the autonomous driving in traffic congestion is satisfied, the determination result in S705 is "YES", and the determination result in S706 or S707 is "YES".

In the present embodiment, when the start condition for the autonomous driving in traffic congestion is satisfied, the setting processing for the ultrashort time flag Fs in S1403 and the like is executed before the processing proceeds to S703. Specifically, first, in S1403, the driving control ECU 17 acquires, that is, calculates, the possible duration Tc for the autonomous driving in traffic congestion. The processing content of S1403 is similar to S806 and S807 in the flowchart illustrated in FIG. 8.

Next, in S1404, the driving control ECU 17 determines whether or not the possible duration Tc for the autonomous driving in traffic congestion is equal to or longer than the time limit TcL. When the possible duration Tc for the autonomous driving in traffic congestion is equal to or longer than the time limit TcL (i.e., S1404: YES), the driving control ECU 17 resets the ultrashort time flag Fs in S1405 (i.e., Fs=0), and then advances the processing to S703. On the other hand, when the possible duration Tc for the autonomous driving in traffic congestion is shorter than the time limit TcL (i.e., S1404: NO), the driving control ECU 17 sets the ultrashort time flag Fs in S1406 (i.e., Fs=1), and then advances the processing to S703.

As described above, in the present embodiment, when the possible duration Tc for the autonomous driving is an ultrashort time, the ultrashort time flag Fs is set (i.e., Fs=1 in S1406). Then, immediately after the start of the autonomous driving and before the start of the content selection processing (i.e., S606), the second task permission message is presented (i.e., S1302). As a result, in a case where the autonomous driving is executed in an ultrashort time, the second task permission message for notifying the driver or the like that the second task can be used is presented at an earlier stage. Therefore, according to the present embodiment, it is possible to satisfactorily ensure the time during which the driver or the like can use the second task even during the ultrashort-time autonomous driving, and convenience is improved.

Third Additional Embodiment: Fifth Embodiment

Hereinafter, a fifth embodiment will be described. The present embodiment relates to a technique for making it possible to smoothly switch the driving at the termination of autonomous driving by preventing the driver's consciousness from being too far from the driving of the own vehicle (i.e., the traveling state and the driving operation) due to the second task when the autonomous driving is executed for a long time or a long distance. Specifically, in the present embodiment, the in-vehicle system 10, that is, the HMI control device 23, is configured to present the traveling state or the surrounding information of the own vehicle by the HMI device 20 when the autonomous driving can be continued for a predetermined interrupt wait time or longer from the start of the execution of the second task. The "surrounding information" includes information concerning a traffic environment around the own vehicle (e.g., a presence state of other vehicles ahead and in an adjacent lane) and/or traffic information around the own vehicle. That is, the "surrounding information" typically includes a road condition of a place to which the own vehicle is going.

Figure 15:
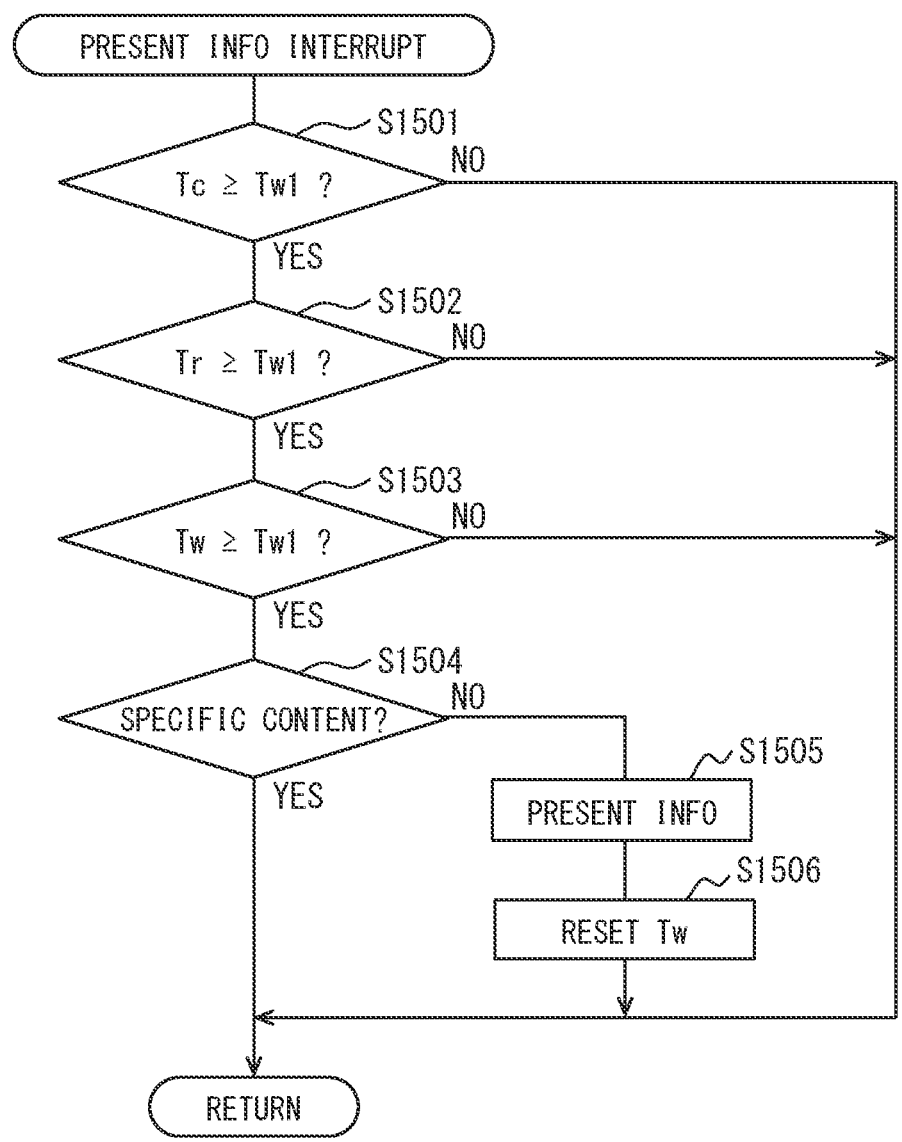
FIG. 15 is a flowchart illustrating still another operation example of the HMI control device illustrated in FIG. 1.

FIG. 15 illustrates an operation example corresponding to the present embodiment. The HMI control device 23 repeatedly starts the information interrupt presentation routine illustrated in FIG. 15 at predetermined time intervals (e.g., 100 msec) during the execution of the second task. "During the execution of the second task" is a period from a time point at which the processing in the flowchart illustrated in FIG. 6 or 13 proceeds to S607 to a time point at which the processing in the flowchart illustrated in FIG. 6 proceeds to S610. Each processing in such a routine corresponds to the operation of the second task presentation unit 234 and/or the display control unit 236.

When such a routine is started, first, in S1501, the HMI control device 23 determines whether or not the possible duration Tc for the autonomous driving is equal to or longer than a predetermined interrupt wait time Tw1. When the possible duration Tc is shorter than the interrupt wait time Tw1 (i.e., S1501: NO), all the processing after S1502 is skipped, and this routine is terminated temporarily.

When the possible duration Tc is equal to or longer than the interrupt wait time Tw1 (i.e., S1501: YES), the HMI control device 23 advances the processing to S1502. In S1502, the HMI control device 23 determines whether or not a remaining time Tr is longer than or equal to the interrupt wait time Tw1. The remaining time Tr is a required time from the present time to a time at which the currently executed autonomous driving is expected to be terminated. That is, the remaining time Tr is calculated by subtracting a duration Tw of the autonomous driving from the possible duration Tc calculated at the start of the autonomous driving.

When the remaining time Tr is shorter than the interrupt wait time Tw1 (i.e., S1502: NO), all the processing after S1503 is skipped, and this routine is terminated temporarily. On the other hand, when the remaining time Tr is longer than or equal to the interrupt wait time Tw1 (i.e., S1502: YES), the HMI control device 23 advances the processing to S1503.

In S1503, the HMI control device 23 determines whether or not the duration Tw is longer than or equal to the interrupt wait time Tw1. The duration Tw is a required time from a predetermined continuation reference time point to the present time. The continuation reference time point is closer to the present time between the time point when the currently executed autonomous driving is started and the time point when the HMI device 20 previously executed the presentation operation of the traveling state or the surrounding information of the own vehicle.

When the duration Tw is shorter than the interrupt wait time Tw1 (i.e., S1503: NO), all the processing after S1504 is skipped, and this routine is terminated temporarily. On the other hand, when the duration Tw is equal to or longer than the interrupt wait time Tw1 (i.e., S1503: YES), the HMI control device 23 advances the processing to S1504.

In S1504, the HMI control device 23 determines whether or not specific content is currently being executed or used. The "specific content" is a type of second task content, which causes an occupant to feel annoyed when interrupt of information presentation occurs during the use or execution, and is a movie, a game, or the like, for example.

In a case where the specific content is currently being executed or used (i.e., S1504: YES), when the information of the traveling state or the surrounding information of the own vehicle is presented on the HMI device 20 at the present time, the occupant using the second task may feel annoyed. Therefore, in this case, such information presentation may be configured to be waited until the timing when the specific content is terminated temporarily. Therefore, in this case, the HMI control device 23 skips the processing of S1505 and S1506 and temporarily terminates this routine.

In a case where the specific content is not currently being executed or used (i.e., S1504: NO), even when the information of the traveling state or the surrounding information of the own vehicle is presented on the HMI device 20 at the present time, there is a low possibility that the occupant using the second task feels annoyed. Thus, in this case, such information presentation may be executed at the present time. Therefore, in this case, the HMI control device 23 temporarily terminates this routine after performing the processing of S1505 and S1506 related to the information presentation operation. When the specific content is a game, there is a scene where the progress of the game is temporarily stopped depending on the state of a character operated by the player. For example, a scene, in which the character operated by the player falls down to an enemy character or the input of the selection result according to the decision making of the player is waited for, corresponds to the above scene. When such a scene occurs, the determination result of S1504 may be "NO".

In S1505, the HMI control device 23 presents the information of the traveling state or the surrounding information of the own vehicle by the HMI device 20. In S1506, the HMI control device 23 resets the duration Tw. As a result, it is possible to repeatedly present the traveling state or the surrounding information of the own vehicle at intervals of the interrupt wait time Tw1 until the currently executed autonomous driving is terminated.

As described above, according to the present embodiment, when the autonomous driving is executed for a long time or a long distance, the vehicle information or the surrounding information of the own vehicle, that is, at least some of the driving state, the traffic environment, and the traffic information, is presented at least once before a driving switch period. This makes it possible to smoothly switch the driving at the termination of the autonomous driving. By performing the information presentation at the time of interruption or termination of the second task content, it is possible to satisfactorily avoid causing the occupant who is using the second task to feel annoyed. From such a viewpoint, for example, the second task presentation unit 234 may present the long-time content and the short-time content alternately.

Overall Summary of Additional Embodiments

The period when "autonomous driving", which corresponds to SAE Level 3 to 5 and in which the occupant such as the driver is not obliged to monitor the surroundings, is executed can change depending on the type of road, the status around the own vehicle, and the like. For this reason, it is required to achieve a traveling environment convenient for the driver or the like whichever the period when the autonomous driving, in which the driver or the like is not obliged to monitor the surroundings, is executed is long or short. In this regard, according to the third to fifth embodiments, it is possible to provide the driver or the like with a convenient traveling environment even if the period when the autonomous driving, in which the driver or the like is not obliged to monitor the surroundings, is executed is an ultrashort time.

(Modifications)

The present disclosure is not limited to the above embodiments. Hence the above embodiments can be changed appropriately. Hereinafter, representative modifications will be described. In the following description of modifications, differences from the above embodiments will be mainly described. In the above embodiments and the modifications, the same or equivalent portions are denoted by the same reference numerals. Therefore, in the following description of the modifications, with respect to constituent elements having the same reference numerals as those in the embodiments, the description in the above embodiments can be appropriately incorporated unless there is a technical contradiction or a special additional description.

The present disclosure is not limited to the specific device configuration described in the above embodiments. That is, for example, the vehicle mounted with the in-vehicle system 10 is not limited to a four-wheeled vehicle. Specifically, such a vehicle may be a three-wheeled automobile or may be a six-wheeled or eight-wheeled automobile such as a cargo truck. The type of the vehicle may be a conventional vehicle including only an internal combustion engine, an electric vehicle or a fuel cell vehicle not including an internal combustion engine, or a so-called hybrid vehicle. The shape and structure of the vehicle body in the vehicle are not limited to a box shape, that is, a substantially rectangular shape in a plan view. The application of the vehicle, the position of the steering wheel, the number of occupants, and the like are not particularly limited.

As a communication standard constituting the in-vehicle system 10, it is also possible to adopt a communication standard except for Controller Area Network (CAN) (international registered trademark), for example, FlexRay (international registered trademark) or the like. The communication standard constituting the in-vehicle system 10 is not limited to one type. For example, the in-vehicle system 10 may have a subnetwork line conforming to a communication standard such as LIN. LIN stands for Local Interconnect Network.

The vehicle state sensor 11, the external state sensor 12, and the surrounding monitoring sensor 13 are also not limited to the above examples. For example, the surrounding monitoring sensor 13 may include sonar, that is, an ultrasonic sensor. Alternatively, the surrounding monitoring sensor 13 may include two or more types of millimeter-wave radar sensor, a sub-millimeter-wave radar sensor, a laser radar sensor, and an ultrasonic sensor. The number of various sensors installed is not particularly limited.

The locator 14 is also not limited to the above examples. For example, the locator 14 may not have the configuration incorporating the gyro sensor and the acceleration sensor. Specifically, the inertial acquisition unit 142 may receive output signals from an angular velocity sensor and an acceleration sensor provided outside the locator 14 as the vehicle state sensor 11.

The DCM 15 can be omitted. That is, the traffic information can be obtained by the navigation device 16. Alternatively, the navigation device 16 may have a configuration including the locator 14 and the DCM 15.

The navigation device 16 may be connected to the HMI control device 23 so as to be able to perform information communication via a sub-communication line different from the in-vehicle communication line 10A.

The navigation device 16 may have a display screen exclusive to navigation screen display different from the HMI device 20. Alternatively, the navigation device 16 may be provided as a part of the HMI device 20. Specifically, for example, the navigation device 16 may be integrated with the CID device 22.

In the road traffic system of each country, execution conditions of autonomous driving, such as the type of autonomous driving and the maximum speed during autonomous driving, can be appropriately considered corresponding to domestic circumstances and the like. For this reason, the above embodiments can be appropriately modified to specifications conforming to the road traffic system of each country. Specifically, for example, in the above embodiments, the driving control ECU 17 has been configured to be able to execute both the high-speed range autonomous driving in which traveling in a high-speed range is possible in a specific section and the autonomous driving in traffic congestion in which traveling in a medium-to-low speed range is possible during traffic congestion. However, the present disclosure is not limited to such an aspect. That is, for example, the driving control ECU 17 may be capable of executing only the high-speed range autonomous driving. Alternatively, the driving control ECU 17 may be capable of executing only the autonomous driving in traffic congestion.

The autonomous driving in traffic congestion may be executable only on an expressway regardless of whether or not the specific section is set. Alternatively, the autonomous driving in traffic congestion may be executable only in the specific section. In these cases, it is particularly advantageous to control the vehicle speed so that the traveling speed does not exceed the upper speed limit of the autonomous driving in traffic congestion in the scene of temporary resolution of the traffic congestion. The traveling conditions in the autonomous driving in traffic congestion can be appropriately set in accordance with the road traffic system of each country. Specifically, for example, in the autonomous driving in traffic congestion, the resolution lower-limit vehicle speed has been 10 km/h, and the resolution upper-limit vehicle speed has been 60 km/h in the above embodiments. However, the present disclosure is not limited to such an aspect. That is, for example, the autonomous driving in traffic congestion can be stably executed without requiring a continuation operation in a speed range of 60 km/h or less, or less than 60 km/h, including a state where the traffic congestion is resolved temporarily. The autonomous driving under such conditions may be referred to as "low-speed autonomous driving". The "low-speed autonomous driving" can be executed regardless of the occurrence of traffic congestion.

In the above embodiments, the driving control ECU 17 is configured to be able to perform a vehicle control operation corresponding to SAE Levels 1 to 3. However, the present disclosure is not limited to such an aspect. That is, for example, the present disclosure can be suitably applied to a case where a vehicle control operation corresponding to each of SAE Levels 1 to 5 can be performed. Further, the level or category of driving automation in the present disclosure is not limited to those defined in "SAE J3016". Moreover, the vehicle speed control unit 173 can be provided as a vehicle control unit that performs vehicle motion control subtasks such as steering control and braking control in addition to the vehicle speed control.

The DSM 18 may be connected to the HMI control device 23 so as to be able to perform information communication via a sub-communication line different from the in-vehicle communication line 10A.

The DSM 18 is not limited to the configuration in which the line of sight or the face direction of the driver is detected by image recognition. That is, for example, the DSM 18 may have a configuration in which the seating posture and the steering wheel holding state of the driver are detected by a sensor different from the image sensor.

The operation unit 19 may include a voice input device that detects the utterance of the driver.

The operation unit 19 may be provided as a part of the HMI device 20.

The HMI device 20 is not limited to the configuration including the meter panel 21 and the CID device 22. That is, for example, the HMI device 20 may include a head-up display. Therefore, the HMI control device 23 may on causes the head-up display to display various information and messages, displayed on the CID display 221 in the above embodiments, instead of or together with the CID display 221. The function and configuration of the head-up display are not particularly limited.

As the head-up display, it is possible to use, for example, a head-up display of a type in which a virtual image is superimposed and displayed on a foreground including the road surface ahead of the own vehicle. The "superimposed display" means that related information (e.g., building name) of a superimposition target (e.g., building) included in the foreground is displayed so as to overlap the superimposition target or in the vicinity of the superimposition target, whereby the superimposition target and the related information are displayed while being associated with each other. The route display to the front road surface, the proceeding-direction display, the traffic information display, and the like also correspond to the "superimposed display".

The meter 211 and the meter display 212 can be achieved by one display device. In this case, the meter 211 can be provided as display areas at both right and left terminates of one display device that is a liquid crystal or organic EL display. That is, the meter 211 can be achieved by displaying, as images, a bezel, a pointer, a scale, and the like corresponding to a tachometer, a speedometer, a water temperature gauge, and the like. The meter display 212 can be provided as a display area except for the meter 211 in such a display device.

The input device 222 may include a pointing device or the like operated by the driver's hand instead of or in addition to the touch panel superimposed on the CID display 221. The input device 222 may include a voice input device that detects the utterance of the driver.

In the above embodiments, the driving control ECU 17 and the HMI control device 23 have had a configuration as a so-called in-vehicle microcomputer including a CPU and the like. However, the present disclosure is not limited thereto.

For example, all or a part of the driving control ECU 17 may include a digital circuit configured to be able to perform the operation as described above, for example, an ASIC or an FPGA. ASIC stands for application specific integrated circuit. FPGA stands for field-programmable gate array. That is, in the driving control ECU 17, the in-vehicle microcomputer portion and the digital circuit portion can coexist. The same applies to the HMI control device 23.

The program according to the present disclosure capable of performing various operations, procedures, or processing described in the above embodiments can be downloaded or upgraded via V2X communication by the DCM 15 or the like. Alternatively, such a program can be downloaded or upgraded via a terminal device provided in a vehicle manufacturing factory, a maintenance factory, a sales shop, or the like. The storage destination of such a program may be a memory card, an optical disk, a magnetic disk, or the like.

The above-described functional blocks and method according to the present disclosure may be implemented by one or more special-purposed computers. Such a special-purposed computer may be provided (i) by configuring (a) a processor and a memory programmed to execute one or more functions embodied by a computer program, Alternatively, the functional blocks and method described in the present disclosure may be implemented by a special purpose computer including a processor with one or more dedicated hardware logic circuits. Alternatively, the functional blocks and method described in the present disclosure may be implemented by a combination of (a) a processor and a memory programmed to execute one or more functions embodied by a computer program and (b) a processor including one or more dedicated hardware logic circuits. The computer program may be stored in a computer-readable non-transitory tangible storage medium as an instruction to be executed by the computer. That is, each of the above functional blocks and method can be implemented as a computer program including instructions for performing the above process, or can be implemented as a non-transitory tangible storage medium in which the computer program is stored.

The present disclosure is not limited to the specific functional configurations and operation examples described in the above embodiments. For example, various messages such as a continuation proposal message and a pay-attention-ahead message may be displayed on another display device instead of or together with the CID display 221. "Another display device" is, for example, the meter display 212 and/or a head-up display (not illustrated).

The continuation operation reception unit 235 may be provided as an operation reception unit that receives various input operations except for the continuation operation.

The design and the operation function in the display screen illustrated in FIG. 2 and the like can also be changed as appropriate. For example, referring to FIG. 2, a function similar to the type change button DA4 or the content change button DA5 can be achieved by a swipe operation in the central display area DA1.

The flowchart illustrated in FIG. 6 and the like can also be changed as appropriate. For example, when the determination result of S604 is "NO", normally, the processing of waiting for the approval operation for a predetermined time, similar to S910, is performed. However, in FIG. 6, the illustration and description of such waiting processing are omitted in relation to the space of the drawing and in relation to simplification of description in the specification.

In the processing of S607, the HMI control device 23 may notify the start of the second task. The notification of the start of the second task can be performed by, for example, character display and/or voice output.

A boundary of distinguishing the short-time content and long-time content is not limited to 30 minutes. That is, for example, the boundary between the two may be 45 minutes, 60 minutes, or 75 minutes. The type of the second task content is not limited to two types of the short-time content and long-time content. That is, for example, the type of the second task content can be classified into three or more in accordance with the required execution duration. In this case, in the processing of S808 and subsequent steps in FIG. 8, a determination as to whether or not the possible duration Tc is less than a third threshold TcZ can be added. Z is a natural number of 3 or more.

In the processing of determining an autonomous driving start condition illustrated in FIG. 7, first, the processing of determining whether or not the section condition is satisfied (i.e., S701) is performed. However, the present disclosure is not limited to such an aspect. That is, for example, first, the determination processing as to whether or not the congestion condition is satisfied (i.e., S705) may be performed. In such a modification, when the congestion condition is not satisfied (i.e., S705: NO), the driving control ECU 17 advances the processing to S701 and determines whether or not the section condition is satisfied. The processing of S702 can also be performed when the determination result in S706 or S707 is "YES".

The congestion condition in S705 is also not limited to the above specific example. That is, for example, when another vehicle is present within a predetermined distance ahead of the own vehicle, another vehicle traveling at a low speed is present in an adjacent lane of the lane in which the own vehicle is traveling, and the traveling speed of the own vehicle is less than a predetermined speed threshold, it may be determined that the congestion condition is satisfied. The predetermined speed threshold is, for example, 10 km/h.

S706 and/or S707 can be omitted. That is, that the latest traffic information has currently been acquired by the information acquisition unit 171 and/or that the state where the congestion condition is satisfied continues for a predetermined time can be excluded from the start condition for the autonomous driving in traffic congestion.

Even when the congestion information cannot be acquired from the traffic information, the predicted congestion time Tj can be calculated. Specifically, for example, a specific traveling section having a high congestion occurrence frequency can be statistically specified on the map information. Such a traveling section is referred to as a "predicted congestion section". Therefore, when the own vehicle enters the actual congestion section while the own vehicle is traveling in the predicted congestion section, the predicted congestion time Tj can be calculated on the basis of the average traveling speed of the own vehicle in the current traffic congestion and the remaining distance of the predicted congestion section.

The display control processing of the second task illustrated in FIG. 11 and the information interrupt presentation processing illustrated in FIG. 15 can be merged. Specifically, for example, in the flowchart illustrated in FIG. 11, when the determination result of any one of S1108 to S1110 is "NO", the information interrupt presentation processing illustrated in FIG. 15 may be performed. The processing content of S1505 in FIG. 15 may be the same as the processing content of S1111 in FIG. 11.

"Less than the threshold" can be changed to "equal to or less than the threshold". Similarly, "equal to or more than the threshold" and "more than the threshold" can be replaced with each other. That is, "<" and "≤" can be replaced with each other. Similarly, ">" and "≥" can be replaced with each other.

Similar expressions such as "acquisition", "calculation", "estimation", "detection", "detection", and "determination" can be appropriately replaced with each other within a range not technically contradictory. The "detection" or the "detection" and the "extraction" can be appropriately replaced within a range not technically contradictory.

It goes without saying that in the above embodiments, the elements constituting the embodiment are not necessarily essential unless otherwise specified as essential or considered to be obviously essential in principle. When numerical values such as the number, amount, and range of constituent elements are mentioned, the present disclosure is not limited to the specific numerical values unless otherwise specified as essential or obviously limited to the specific numerical values in principle. Similarly, when the shape, direction, positional relationship, and the like of a constituent element or the like are mentioned, the present disclosure is not limited to the shape, direction, positional relationship, and the like unless otherwise specified as essential or limited to a specific shape, direction, positional relationship, and the like in principle.

The modifications are not limited to the above-described examples. For example, multiple embodiments may be combined with each other under a condition that they are not technically inconsistent. Further, a plurality of modifications may be combined together. Furthermore, all or a part of the above-described embodiments and all or a part of the modifications may be combined with each other under a condition that they are not technically inconsistent.

(Brief)

(1) The present disclosure described in the above embodiments and modifications includes the following aspects and embodiments concerning the HMI control method and the HMI control program product. The following aspects can be applied in combination with each other so long as they are not technically inconsistent.

According to an aspect of the present disclosure, an HMI control method is provided. The HMI control method is executed by at least one processor of an HMI control device that controls an HMI device. The HMI device is mount in a vehicle that is capable of performing an autonomous driving as a first task. The HMI control method includes: acquiring a possible duration for the autonomous driving; and presenting, by the HMI device, a second task that an occupant on a driver's seat is able to start executing during the autonomous driving based on the acquired possible duration.

According to another aspect of the present disclosure, an HMI control program product stored in a computer-readable non-transitory storage medium is provided. The HMI control program product includes instructions to be executed by at least one processor of an HMI control device to control an HMI device, which is mount in a vehicle that is capable of performing an autonomous driving as a first task. The instructions include: acquiring a possible duration for the autonomous driving; and presenting, by the HMI device, a second task that an occupant on a driver's seat is able to start executing during the autonomous driving based on the acquired possible duration.

In one embodiment, the possible duration may be acquired based on a predicted duration of a traffic congestion in a case where the autonomous driving is started due to the traffic congestion.

In one embodiment, an input operation for continuing the second task under execution may be configured to receive in a case where a temporary resolution of the traffic congestion is detected.

In one embodiment, a detection result of a behavior of the occupant on the driver's seat may be acquired, and the input operation may be enabled in response to acquiring of the detection result indicating that the occupant on the driver's seat is checking a road condition of a place toward which the vehicle is traveling.

In one embodiment, the vehicle is capable of performing the autonomous driving within a predetermined speed range during the traffic congestion. When the input operation is enabled, a driving control device may be notified of the enabling of the input operation in order to control a traveling speed of the vehicle within the predetermined speed range.

In one embodiment, the HMI device may be controlled to display the road condition of the place toward which the vehicle is traveling in response to acquiring of the detection result indicating that the occupant on the driver's seat is checking the road condition of the place toward which the vehicle is traveling.

In one embodiment, a detection result of a behavior of the occupant on the driver's seat may be acquired, and the HMI device may be controlled to display a road condition of a place toward which the vehicle is traveling in response to acquiring of the detection result indicating that the occupant on the driver's seat is checking the road condition of the place toward which the vehicle is traveling.

In one embodiment, a plurality of the second tasks having different required execution durations may be presented in a case where acquiring of the possible duration for the autonomous driving ends with failure. Thus, the occupant is able to select one of the plurality of second tasks.

In one embodiment, in a case where the possible duration corresponding to a specific traveling section, in which the autonomous driving is set to be possible, is shorter than a predetermined execution lower limit, no second task is permitted to start being executed in the specific traveling section.

In one embodiment, the possible duration may be acquired based on a distance of a specific traveling section, in which the autonomous driving is set to be possible.

In one embodiment, an execution of the second task during the traffic congestion is permitted regardless of a length of the possible duration acquired based on the predicted duration of the traffic congestion.

In one embodiment, the HMI device that presents the second task during the traffic congestion may be limited to an in-vehicle device in a case where the possible duration acquired based on the predicted duration of the traffic congestion is shorter than a predetermined model-limiting duration.

In one embodiment, in a case where the possible duration is shorter than a predetermined time limit, the HMI device may be controlled to present information indicating that the second task is executable instead of or prior to presentation of the second task which is determined to be executable based on the possible duration.

In one embodiment, in a case where the autonomous driving is continued, from an execution start of the second task, for a time period equal to or longer than a predetermined interrupt wait time, the HMI device presents a traveling state of the vehicle and surrounding information of the vehicle.

(2) The present disclosure described in the above embodiments and modifications includes the following aspects and embodiments concerning the driving control method and the driving control program product. The following aspects can be applied in combination with each other so long as they are not technically inconsistent.

According to an aspect of the present disclosure, a driving control method is provided. The driving control method controls a driving of a vehicle, which is capable of performing an autonomous driving as a first task within a predetermined speed range during a traffic congestion. The driving control method includes: acquiring at least a traveling state of the vehicle; determining an executability of the autonomous driving based on the acquired traveling state; controlling a traveling speed of the vehicle in accordance with the determined executability of the autonomous driving; acquiring a congestion state as the traveling state; acquiring, from an HMI control device that controls an HMI device mounted in the vehicle, an execution state of a second task operated by an occupant on a driver's seat; and performing a speed-increase control to increase the traveling speed of the vehicle within the predetermined speed range of the autonomous driving in response to the acquired congestion state indicating a temporary resolution of the traffic congestion and a continuation request for the second task under execution being made by the occupant.

According to another aspect of the present disclosure, a driving control program product stored in a computer-readable non-transitory storage medium is provided. The driving control program product includes instructions to be executed by at least one processor of a driving control device that controls driving of a vehicle, which is capable of performing an autonomous driving as a first task within a predetermined speed range during a traffic congestion. The instructions include: acquiring at least a traveling state of the vehicle; determining an executability of the autonomous driving based on the acquired traveling state; controlling a traveling speed of the vehicle in accordance with the determined executability of the autonomous driving; acquiring at least a congestion state as the traveling state of the vehicle; acquiring, from an HMI control device that controls an HMI device mounted in the vehicle, an execution state of a second task operated by an occupant on a driver's seat; and controlling the traveling speed of the vehicle to be increased within the predetermined speed range of the autonomous driving in response to the acquired congestion state indicating a temporary resolution of the traffic congestion and a continuation request for the second task under execution being made by the occupant.

In one embodiment, an execution of the autonomous driving may be determined in a case where the vehicle travels on an exclusive road where the traffic congestion is occurred. The exclusive road has a minimum speed limit and the minimum speed limit is within the predetermined speed range of the autonomous driving. During a traveling on the exclusive road, the traveling speed of the vehicle may be controlled to to be equal to or higher than the minimum speed limit of the exclusive road and within the predetermined speed range of the autonomous driving in response to the acquired congestion state indicating the temporary resolution of the traffic congestion and the continuation request for the second task under execution being made by the occupant.

In one embodiment, a continuation of the autonomous driving may be determined in a case where an input operation for continuing the second task under execution is effectively received by the HMI device and accordingly the continuation request is notified from the HMI device.

In one embodiment, the input operation for continuing the second task under execution may be determined to be effectively received by the HMI device and accordingly the continuation request may be determined to be notified from the HMI device in a case where a detection result of a behavior of the occupant on the driver's seat indicates that the occupant checks a road condition of a place toward which the vehicle is traveling.

In one embodiment, in a case where the possible duration corresponding to a specific traveling section, in which the autonomous driving is set to be possible, is shorter than a predetermined execution lower limit, no second task is permitted to start being executed in the specific traveling section.

In one embodiment, an execution of the second task during the traffic congestion may be permitted regardless of a length of the possible duration acquired based on the predicted duration of the traffic congestion.

What is claimed is:

1. A human-machine-interface (HMI) control device configured to control an HMI device mounted on a vehicle, the vehicle being capable of performing an autonomous driving as a first task, the HMI control device comprising:
 a second task presentation unit that presents, by the HMI device, second tasks that are executable by an occupant on a driver's seat during the autonomous driving, the second tasks referring to tasks executed by the occupant except for a driving operation,
 wherein the second task presentation unit presents the second tasks, which have different required execution durations from one another, in a selectable manner.

2. A human-machine-interface (HMI) control device configured to control an HMI device mounted on a vehicle, the vehicle being capable of performing an autonomous driving as a first task, the HMI control device comprising:
 a second task presentation unit that presents, by the HMI device, a second task that is executable by an occupant on a driver's seat during the autonomous driving, the second task referring to a task executed by the occupant except for a driving operation,
 wherein, in response to the autonomous driving being continued for a predetermined period with the second task being executed, the second task presentation unit presents surrounding information of the vehicle by the HMI device.

3. A computer-readable non-transitory storage medium storing a human-machine-interface (HMI) control program, the HMI control program comprising instructions to be executed by a processor of an HMI device mounted on a vehicle, the vehicle being capable of performing an autonomous driving as a first task, the instructions comprising:
 presenting, by the HMI device, second tasks that are executable by an occupant on a driver's seat during the autonomous driving, the second tasks referring to tasks executed by the occupant except for a driving operation; and
 presenting the second tasks, which have different required execution durations from one another, in a selectable manner.

4. A computer-readable non-transitory storage medium storing a human-machine-interface (HMI) control program, the HMI control program comprising instructions to be executed by a processor of an HMI device mounted on a vehicle, the vehicle being capable of performing an autonomous driving as a first task, the instructions comprising:
 presenting, by the HMI device, a second task that is executable by an occupant on a driver's seat during the autonomous driving, the second task referring to a task executed by the occupant except for a driving operation; and
 in response to the autonomous driving being continued for a predetermined period with the second task being executed, presenting surrounding information of the vehicle by the HMI device.

* * * * *